US005898490A

United States Patent [19]

Ohtomo et al.

[11] Patent Number: 5,898,490
[45] Date of Patent: Apr. 27, 1999

[54] LASER SURVEY INSTRUMENT

[75] Inventors: Fumio Ohtomo; Satoshi Hirano, both of Tokyo-to, Japan

[73] Assignee: Kabushiki Kaisha TOPCON, Tokyo-to, Japan

[21] Appl. No.: 08/820,725

[22] Filed: Mar. 11, 1997

[30] Foreign Application Priority Data

Mar. 19, 1996 [JP] Japan ..................... 8-090198

[51] Int. Cl.⁶ .................................... G01B 11/26
[52] U.S. Cl. ..................... 356/141.3; 356/141.1
[58] Field of Search ............... 356/141.1, 141.3

[56] References Cited

U.S. PATENT DOCUMENTS

| | | | |
|---|---|---|---|
| 4,830,489 | 5/1989 | Cain et al. | 356/73 |
| 5,055,666 | 10/1991 | Miyahara | 250/206.1 |
| 5,098,185 | 3/1992 | Watanabe et al. | 356/5 |
| 5,204,731 | 4/1993 | Tanaka et al. | 356/1 |
| 5,294,970 | 3/1994 | Dornbusch et al. | 356/152 |
| 5,471,218 | 11/1995 | Talbot et al. | 342/357 |

*Primary Examiner*—Mark Hellner
*Attorney, Agent, or Firm*—Nields, Lemack & Dingman

[57] ABSTRACT

A laser survey instrument according to the present invention comprises at least an object reflector detecting unit for irradiating a detection laser beam, a main body rotating unit for rotating the object reflector detecting unit, and an object reflector for reflecting the detection laser beam toward the object reflector detecting unit, whereby said object reflector detecting unit comprises a light emitter for emitting said detection laser beam, a rotator for irradiating the laser beam for reciprocal scanning, a reflection light detecting unit for receiving and detecting the reflection laser beam from the object reflector, and a scanning controller for controlling said rotator, and the object reflector detecting unit detects the object reflector and determines the direction of the object reflector detecting unit by the main body rotating unit and automatically sets the direction of the laser survey instrument.

14 Claims, 26 Drawing Sheets

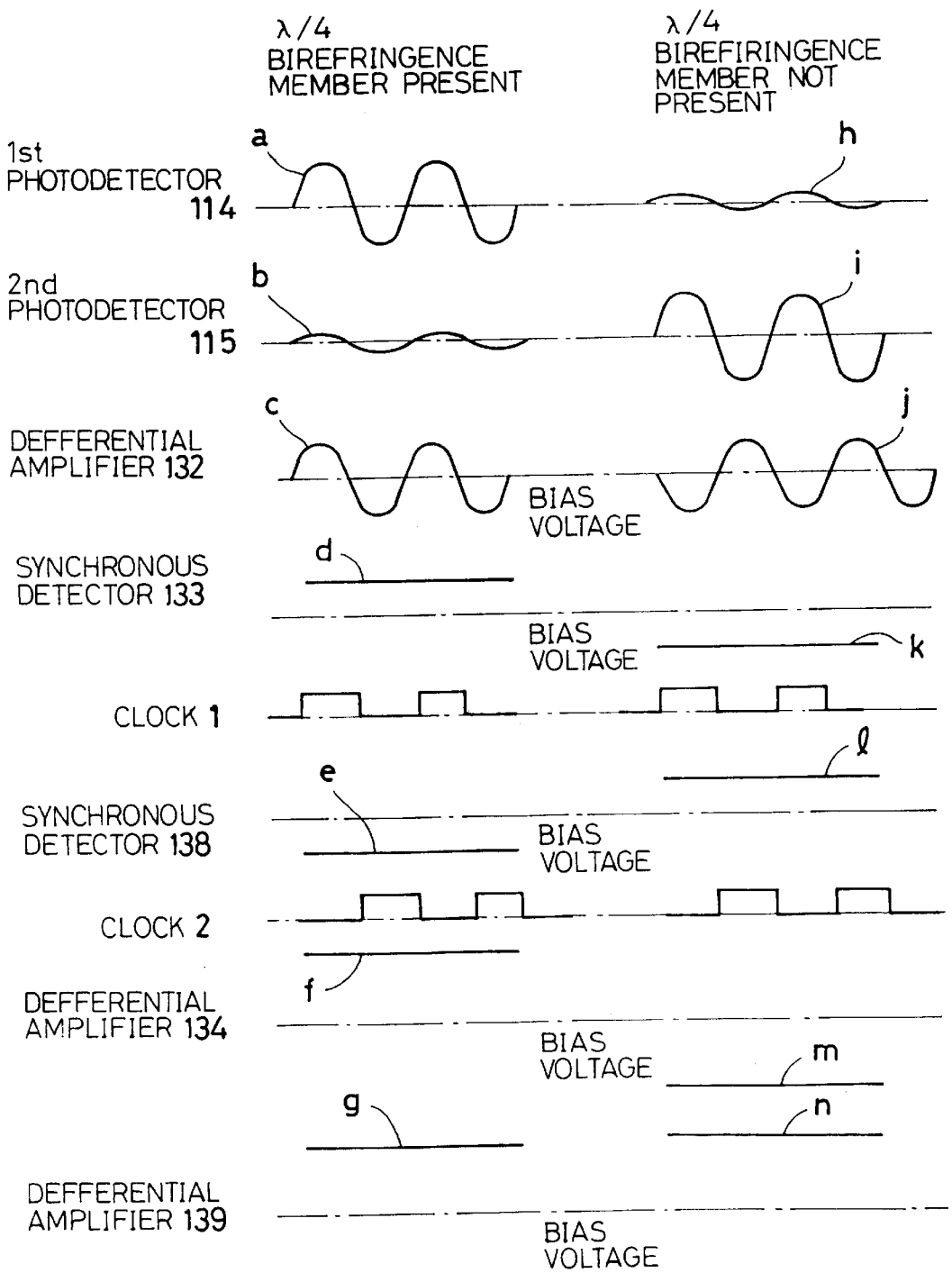

OUTPUT SIGNAL OF
DEFFERENTIAL
AMPLIFIER 134

LASER SURVEY INSTRUMENT

BACKGROUND OF THE INVENTION

The present invention relates to a laser survey instrument, by which it is possible to form a horizontal reference plane, in particular to form an arbitrary tilt setting plane tilted at a given angle with respect to the horizontal reference plane using a laser beam.

A laser survey instrument is currently used to provide a horizontal reference level for a wide range instead of an optical level.

In this type of laser survey instrument, a laser beam is irradiated in a horizontal direction to thereby form a horizontal reference line, or a laser beam is irradiated in a horizontal direction via a rotating prism, and a horizontal reference plane is formed.

In architectural engineering work and civil engineering work, positioning and setting of a horizontal level are performed by utilizing the horizontal reference plane. For example, a laser beam is detected by a photodetetor to determine a reference position, or it is used for marking-out to determine a position to mount a window in construction of the interior or to set horizontality of a ceiling.

As the present applicant proposed in Japanese Patent Publication Laid-Open No.6-26861, the laser survey instrument of this type is used not only for the setting of the horizontal level but also for the setting of the tilting level, and it is applied in construction work such as inclined drainage system on road or in setting a gradient on road.

Description is now given on a laser irradiation unit 4 of a laser survey instrument disclosed in Japanese Patent Publication Laid-Open No.6-26861, referring to FIG. 25 to FIG. 32.

At the center of a casing 5, a recess 6 in form of a truncated cone is provided, and a support seat 7 is formed at the center of the recess 6. The support seat 7 has projections 9, which are protruded smoothly with tertiary curved surface at three positions equally divided on inner periphery of a circular through-hole 8.

A laser projector 10 for emitting a laser beam is placed in the through-hole 8, and a head 11 of the laser projector 10 is engaged in and supported by the support seat 7. The lower portion of the head 11 is formed in spherical shape, and this spherical portion 11a is slidably engaged with the three projections 9. The laser projector 10 is supported in such manner that it can be tilted in any direction with respect to a vertical line.

A motor seat 14 is mounted on the head 11, and a scanning motor 15 is arranged on the motor seat 14. A gear 16 is engaged on an output shaft of the scanning motor 15 and is engaged with a scanning gear 17, which will be described later.

The axis of the laser projector 10 is aligned with the head 11 of the laser projector 10, and a mirror holder 13 is rotatably mounted via a bearing 12. The scanning gear 17 is engaged on the mirror holder 13. As described above, the scanning gear 17 is engaged with the gear 16 so that the mirror holder 13 can be rotated around the vertical axis by the scanning motor 15. A pentagonal prism 18 is provided on the mirror holder 13, and a laser beam emitted from the laser projector 10 is irradiated as a reference laser beam 77 in a horizontal direction through a projection window 19.

On the middle portion of the laser projector 10, a sensor supporting shelf 63 is provided, and fixed bubble tubes 20 and 21, serving as tilt detectors for detecting a horizontal line, are arranged on the sensor supporting shelf 63 so that the bubble tubes are laid in directions perpendicular to each other. The fixed bubble tubes 20 and 21 are capacitance detection type electric bubble tubes and issue electric signals corresponding to a tilt angle with the horizontal plane as a reference.

On the lower end of the laser projector 10, a base plate 64 approximately in shape of a right-angled triangle is fixed, and a column 70 is erected near the vertex of the base plate 64, and a ball 67 is fixed on the upper end of the column 70. A right-angled L-shaped tilting base plate 62 is arranged above the base plate 64, and a conical recess 99 is formed at the L-shaped vertex in rear of the tilting base plate 62, and the ball 67 is engaged in the recess 99. The top of the tilting base plate 62 is supported by the column 70, and the tilting base plate 62 is pivotally movable around the ball 67. Further, a spring 68 is arranged between the tilting base plate 62 and the base plate 64. Thus, the conical recess 99 is pressed against the ball 67, and the tilting base plate 62 is pushed in a clockwise direction in FIG. 25.

On the tilting base plate 62, arbitrary angle setting bubble tubes 65 and 66, serving as tilting slope detectors, are provided along lines, which cross each other perpendicularly along the L-shape.

A bearing plate 72 is positioned below the sensor supporting shelf 63, and the bearing plate 72 is protruded from the laser projector 10. On the base plate 64, tilting screws 52 and 53 are rotatably mounted at such positions that these form a triangle with the column 70 as vertex. The upper ends of each of the tilting screws 52 and 53 is rotatably supported by the bearing plate 72.

The lower end of the tilting screw 52 is protruded downward from the base plate 64, and a tilting gear 54 is engaged on a protruded end of the tilting screw 52, and the tilting gear 54 is engaged with a tilting gear 56, which will be described later. The lower end of the tilting screw 53 is protruded downward from the base plate 64. A tilting gear 55 is engaged on a protruded end of the tilting screw 53, and the tilting gear 55 is engaged with a tilting gear 57 to be described later.

A tilting nut 48 is screwed on the tilting screw 52, and a nut pin 50 having circular cross-section is protruded on the tilting nut 48. From the end surface of the tilting base plate 62 closer to the arbitrary angle setting bubble tube 65, a tilting pin 60 having circular cross-section is protruded in parallel to the center line of the arbitrary angle setting bubble tube 65, and the tilting pin 60 is brought into contact with the nut pin 50. Further, two parallel guide pins 71 are bridged between the base plate 64 and the bearing plate 72. The tilting pin 60 is slidably sandwiched by the two guide pins 71 so that rotation of the tilting base plate 62 in a horizontal direction is restricted, while it allows the tilting pin 60 to rotate in a vertical direction and also around the axis of the tilting pin 60.

A tilting nut 49 is screwed on the tilting screw 53, and a nut pin 51 with circular cross-section is protruded on the tilting nut 49. From the end surface of the tilting base plate 62 closer to the arbitrary angle setting bubble tube 66, a tilting pin 61 having circular cross-section is protruded in parallel to the center line of the arbitrary angle setting bubble tube 66, and the tilting pin 61 is brought into contact with the nut pin 51.

A pedestal 73 is vertically erected on the lower surface of the base plate 64, and a tilting detector 23, also serving as a motor base, is fixed on the base plate 64 via the pedestal 73. On the upper surface of the tilting detector 23, tilting motors 58 and 59 are provided. The tilting gear 56 as described above is engaged on an output shaft of the tilting motor 58, and the tilting gear 57 as described above is engaged on an output shaft of the tilting motor 59, and these are engaged with the tilting gears 54 and 55 respectively.

On the lower surface of the tilting detector 23, a ring-like reflection mirror is arranged. At positions opposite to the tilting detector 23, a given number (4 in the present embodiment) of optical sensors 24a, 24b, 24c and 24d each comprising a set of light emitting elements and photodetection elements are arranged on the same circumference around the axis of the laser projector 10 when the casing 5 and the laser projector 10 are at a vertical position.

From the head 11 of the laser projector 10, tilting arms 25 and 26 are elongated in a horizontal direction, and after passing through conical surface of the recess 6, these are positioned inside the casing 5. At the tip of each of the tilting arms 25 and 26, engaging pins 27 and 28 are provided. The engaging pins 27 and 28 are designed in cylindrical shape. The axes of these cylinders cross each other perpendicularly, and a positional relationship is determined in such manner that these are included within a plane, which passes through the spherical center of the spherical portion 11a. For one of the engaging pins 27 and 28, e.g. the engaging pin 27, horizontal movement is restricted, and it is allowed to move only in a vertical direction. Although not shown in the figure, the engaging pin 27 is slidably engaged in a guide groove extending in a vertical direction, or the engaging pin 27 may be slidably pressed against the wall surface extending in a vertical direction by resilient means such as a spring, etc.

On the inner wall of the casing 5, shelf plates 29 and 30 are arranged, and a level adjusting motor 31 is mounted on the shelf plate 29, and a level adjusting motor 32 is mounted on the shelf plate 30. A driving gear 33 is engaged on a rotation shaft of the level adjusting motor 31, and a driving gear 34 is engaged on a rotation of the level adjusting motor 32. A screw shaft 35 running perpendicularly to the engaging pin 27 and bridging between the ceiling of the casing 5 and the shelf plate 29 is rotatably arranged, and a driven gear 36 is mounted on the screw shaft 35. The driven gear 36 is engaged with the driving gear 33. A slide nut 37 is screwed on the screw shaft 35, and a pin 38 is protruded on the slide nut 37 so that the pin 38 and the engaging pin 27 are slidably brought into contact with each other.

Similarly, a screw shaft 39 running perpendicularly to the engaging pin 28 and bridging over the ceiling of the casing 5 and the shelf plate 30 is rotatably provided. A driven gear 40 is mounted on the screw shaft 39 and the driven gear 40 is engaged with the driving gear 34. A slide nut 41 is screwed on the screw shaft 39, and a pin 42 is protruded on the slide nut 41 so that the pin 42 and the engaging pin 28 are slidably brought into contact with each other.

On the ceiling of the casing 5 and between the screw shaft 35 and the screw shaft 39, a spring receptacle 43 is provided, and a spring 44 is mounted between the spring receptacle 43 and the laser projector 10, and the laser projector 10 is pushed clockwise around the support seat 7 in FIG. 25.

In the figure, reference numeral 45 represents a battery box for accommodating a battery to drive the laser survey instrument. The laser irradiation unit 4 of the laser survey instrument as described above is installed on a tripod (not shown) via leveling bolts 46 for leveling purpose. Reference numeral 47 represents a glass window to surround the mirror holder 13.

A control unit of the conventional type instrument is shown in FIG. 30.

The results of the detection by the fixed bubble tube 20 and the arbitrary angle setting bubble tube 65 are inputted to an angle detection circuit 87 via a switching circuit 85, and the results of detection of the fixed bubble tube 21 and the arbitrary angle setting bubble tube 66 are inputted to an angle detection circuit 88 via a switching circuit 86. On the angle detection circuits 88 and 87, reference angles 92 and 91 are set respectively. The reference angles 91 and 92 are normally 0°.

When a signal from the fixed bubble tube 20 is inputted to the angle detection circuit 87 by the switching circuit 85, the angle detection circuit 87 detects a deviation from the reference angle 91. The signal of the angle detection circuit 87 is inputted to a motor controller 89, which drives and controls the level adjusting motor 31.

When signals from the fixed bubble tube 20 and the arbitrary setting bubble tube 65 are inputted to the angle detection circuit 87 by the switching circuit 85, the angle detection circuit 87 outputs a signal corresponding to the deviation. This signal is inputted to a tilt driving circuit 83, which drives and controls the tilting motor 58. When a signal from the arbitrary angle setting bubble tube 65 is inputted to the angle detection circuit 87 by the switching circuit 85, the angle detection circuit 87 detects a deviation from the reference angle 91. The signal of the angle detection circuit 87 is inputted to the motor controller 89, which drives and controls the level adjusting motor 31.

A signal of the angle detection circuit 88 is inputted to a motor controller 90, which drives and controls the level adjusting motor 32. The signal of the angle detection circuit 88 and the signal from an arbitrary angle setter 82 are inputted to a tilt driving circuit 84, which drives and controls the tilting motor 59.

Angular deviations of the angle detection circuits 87 and 88 are inputted to a discriminator 93. The discriminator 93 selects an angular deviation of the angle detection circuits 87 or 88, whichever is greater, and an output corresponding to the change of the angular deviation thus selected is outputted to a display unit driver 94, which displays a value corresponding to the deviation on a display unit 95.

A reference plane formed by a reference laser beam 77 can be set in a horizontal direction or at any desired angle. In the following, description will be given on leveling operation of the laser survey instrument to form the horizontal reference plane.

When the laser irradiation unit 4 is installed and no adjustment is made yet, the axis of the laser projector 10 is generally not aligned with a vertical line, and the fixed bubble tubes 20 and 21 are not in a horizontal position. By the switching circuits 85 and 86, signals from the fixed bubble tubes 20 and 21 are inputted to the angle detection circuits 87 and 88.

When the reference angles 91 and 92 are 0°, angular deviation signals are issued from the angle detection circuits 87 and 88. When the angular deviation signals are issued, the motor controllers 89 and 90 drive the level adjusting motors 31 and 32 in such direction that the angular deviation signal is turned to 0.

Description is now given on an operation relating to one of the level adjusting motors 31 and 32, e.g. the former.

When the level adjusting motor 31 is driven, rotation of the level adjusting motor 31 is transmitted to the screw shaft 35 via the driving gear 33 and the driven gear 36. With the rotation of the screw shaft 35, the slide nut 37 is moved up or down. Upward or downward movement of the slide nut 37 is transmitted to the tilting arm 25 via the pin 38 and the engaging pin 27, and the laser projector 10 is tilted.

As described above, the engaging pin 27 is restricted to move in a horizontal direction, and it is allowed to move only in a vertical direction. Thus, the tilting direction of the laser projector 10 is under restriction, and it is tilted around the axis of the engaging pin 28, which passes through the spherical center of the spherical portion 11a. Next, when the level adjusting motor 32 is driven, the screw shaft 39 is rotated, and the engaging pin 28 is moved up or down via the pin 42.

The movement in a horizontal direction of the engaging pin 27 is restricted by a groove (not shown), and its movement in a vertical direction is restricted by the pin 38 and the spring 44. Accordingly, the engaging pin 27 is allowed only to rotate around the axis of the engaging pin 27, which passes through the spherical center of the spherical portion 11a.

When the pin 42 is moved up or down, being associated with sliding movement in an axial direction between the pin 42 and the engaging pin 28, vertical movement is given to the engaging pin 28, and the laser projector 10 is tilted around the axis of the engaging pin 27. Because cross-section of the engaging pin 27 is circular as described above, titling of the axis of the engaging pin 27 does not change even when the engaging pin 27 is rotated. That is, a tilting operation by each of the level adjusting motors 31 and 32 exerts no influence on the other tilting shaft, i.e. tilting of the axes of the engaging pins 27 and 28. Therefore, a tilt adjustment of one shaft can be independently performed from that of the other shaft, and a tilt adjusting operation and a control sequence relating to the tilt adjusting operation are extremely simplified.

The laser projector 10 is pushed clockwise in FIG. 25 by the spring 44. Accordingly, the laser projector 10 accurately follows after the movement of the slide nut 37.

Because the spherical portion 11a of the laser projector 10 is supported at three points by the projections 9 as described above, when the laser projector 10 is tilted, it is stably supported and does not totter. Because the spherical portion 11a is in contact with the projections 9 having smooth curved surfaces, the laser projector 10 can be moved smoothly and freely in any tilting directions, and posture of the laser projector 10 can be easily adjusted.

When the laser projector 10 is tilted, and a leveling operation proceeds, the detection values of the fixed bubble tubes 20 and 21 are turned closer to those of the horizontal plane. Finally, the angular deviation outputted by the motor controllers 89 and 90 is turned to 0, and the leveling operation is completed.

The detection ranges of the fixed bubble tubes 20 and 21 are narrow. When a given range is exceeded, it is turned to saturation state. Then, a tilting direction can be detected, but the value of the tilt angle cannot be detected. For this reason, the optical sensors 24a, 24b, 24c and 24d are provided in order that the adjusting mechanism comprising the level adjusting motors 31 and 32, the driving gears 33 and 34, the driven gears 36 and 40, the screw shafts 35 and 39, the slide nuts 37 and 41, the tilting arms 25 and 26, etc. may not be operated beyond the mechanical adjustment range. Specifically, when mechanical adjustment range is reached, the light emitted from one of the optical sensors 24a, 24b, 24c and 24d is reflected by the reflection mirror provided on the tilting detector 23, and the light is then received by the optical sensor, and it is detected that the limit of the mechanical adjustment range has been reached. Then, the level adjusting motors 31 and 32 are stopped, or it is displayed on the display unit that it is the limit of the mechanical adjustment range, or alarm is issued by buzzer.

When it is turned to such a state, a coarse adjustment is performed to set to the adjustment range using the leveling bolts 46, and the leveling operation is started again.

When the leveling operation has been completed, a laser beam is irradiated from the laser projector 10. Further, by driving the scanning motor 15, the laser projector 10 is rotated around the vertical axis. By irradiating the laser beam in a horizontal direction through the pentagonal prism 18 and by rotating it, a horizontal reference plane is formed by the laser beam.

In the process of the leveling operation, some time is required from the starting to the completion of the leveling. During this period, a progress of the leveling operation is displayed to the operator to notify that the leveling operation is properly performed, thus relieving the operator from feeling uneasiness.

By the discriminator 93, it is judged that the angular deviation outputted from the angle detection circuits 87 and 88 is big or small. The bigger angular deviation is selected, and the condition of the change of the selected angular deviation is outputted to the display unit driver 94. Further, the content of display is changed according to the change of the angular deviation, and it is displayed on the display unit 95.

The bigger angular deviation is selected because more time is required for angular adjustment when the angular deviation is big. Instead of selecting one of big or small angular deviations, a sum of angular deviations outputted from the angle detection circuits 87 and 88 may be obtained, and the content of the display may be changed according to the sum of the angular deviations.

The relationship between the angular deviation and time is as shown in FIG. 31. Based on this relationship, the position to change the display content is set in advance. When it is turned to the position where the angular deviation has been set, the display is switched over, and the progress of the leveling operation is notified to the operator.

Next, description will be given on the case where, after the horizontal reference plane has been formed, the reference plane formed by the reference laser beam 77 is set to an arbitrary angle.

By the arbitrary angle setters 81 and 82, numerical values to tilt the reference plane are inputted to the tilt driving circuits 83 and 84 respectively.

Then, it is judged whether the detection results of the fixed bubble tube 20 and the arbitrary angle setting bubble tube 65 are identical with those of the fixed bubble tube 21 and the arbitrary angle setting bubble tube 66, and it is tried to equalize the results. In this case, it is preferable that the fixed bubble tubes 20 and 21 are at a horizontal position, but they may not be necessarily at a horizontal position and it will be all right if they are not in saturated state.

When the outputs of the fixed bubble tubes 20 and 21 and the outputs of the arbitrary angle setting bubble tubes 65 and 66 agree with each other, the arbitrary angle setting bubble tubes 65 and 66 are tilted so that they are aligned with the angles set by the arbitrary angle setters 81 and 82. Further, the laser projector 10 is tilted so that the arbitrary angle setting bubble tubes 65 and 66 are turned to a horizontal position. Then, the rotation axis of the laser projector 10 is turned to such position as to form the arbitrary angle reference plane as desired. By rotating the laser projector 10, the laser beam reference plane as desired is formed.

More concrete description will be given below. Because an angle setting operation to the arbitrary angle setting bubble tube 65 is the same as the angle setting operation to the arbitrary angle setting bubble tube 66, description will be given below only on the arbitrary angle setting bubble tube 65.

To the switching circuit 85, a switching signal is inputted from an input unit or a control unit (not shown), and a signal from the fixed bubble tube 20 and a signal from the arbitrary angle setting bubble tube 65 are inputted to the angle detection circuit 87. On the angle detection circuit 87, a deviation of the angles detected by the two bubble tubes 20 and 65 is obtained. If there is a deviation, the deviation signal is inputted to the tilt driving circuit 83.

The tilt driving circuit 83 drives the tilting motor 58. Driven by the tilting motor 58, the tilting gear 56 is rotated, and the rotation of the tilting gear 56 is transmitted to the tilting screw 52 via the tilting gear 54, and the tilting nut 48 is moved up or down in a desired direction. The nut pin 50 of the tilting nut 48 is engaged with the tilting pin 60, and the tilting base plate 62 is tilted in such direction that the deviation is turned to 0.

The tilting of the tilting base plate 62 is detected by the arbitrary angle setting bubble tube 65, and it is inputted to the angle detection circuit 87 via the switching circuit 85.

By the angle detection circuit 87, a deviation between detected angles of the fixed bubble tube 20 and the arbitrary angle setting bubble tube 65 is calculated. The detection angle deviation is fed back to the tilt driving circuit 83, and the titling motor 58 is driven until the detection angle deviation is turned to 0.

When the detection angle deviation is turned to 0, the axis of the laser projector 10 is perpendicular to the plane detected by the arbitrary angle setting bubble tubes 65 and 66.

Next, the setting angle is inputted to the tilt driving circuit 83 by the arbitrary angle setter 81, and a tilt reference plane setting operation is started.

On the tilt driving circuit 83, the tilting motor 58 is driven in such manner that it is turned to an angle corresponding to the setting angle inputted by the arbitrary angle setter 81, and the tilting base plate 62 is tilted in a direction reverse to the tilt reference plane to be obtained.

Here, for example, a pulse motor is used as the tilting motor 58. The tilt angle of the tilting base plate 62 and the number of pulses of the pulse motor necessary for the tilting are stored in the tilt driving circuit 83 in advance, and the number of pulses corresponding to the angle set by the arbitrary angle setter 81 is outputted to drive the tilting motor 58.

The tilting screw 52 is rotated by the tilting motor 58, and the tilting nut 48 is moved in a desired direction, for example, in a downward direction.

The movement of the tilting nut 48 is transmitted to the tilting base plate 62 via the nut pin 50 and the tilting pin 60 as described above, and the tilting base plate 62 is tilted counterclockwise in FIG. 25 around the ball 67.

As described above, the tilting pin 60 is guided by the guide pin 71 and is tilted only in a vertical direction. Therefore, the tilting of the tilting pin 60 gives no influence on the tilting of the arbitrary angle setting bubble tube 66.

When the tilting base plate 62 is tilted, an output value from the angle detection circuit 87 is changed, and a comparison result calculated by the tilt driving circuit 83 decreases.

When the comparison result is turned to 0, the driving of the tilting motor 58 is stopped, and the tilt setting operation of the tilting base plate 62 is completed. A signal of this completion is also inputted to the switching circuit 85, and the circuit is switched over in such manner that only the signal from the arbitrary angle setting bubble tube 65 is inputted to the reference angle 91.

An tilting operation for the arbitrary angle setting bubble tube 66 is performed in the same manner. Because the tilting pin 60 is guided by the guide pin 71 as described above, the tilting operation of the arbitrary angle setting bubble tube 66 exerts no influence on the arbitrary angle setting bubble tube 65. Therefore, the tilting operation of the tilting base plate 62 in two directions can be controlled independently from each other, and a control sequence relating to the tilting operation of the tilting base plate 62 in two directions is simple.

When the tilt setting operation of the tilting base plate 62 has been completed, the tilting operation of the laser projector 10 is started for setting the tilt reference plane based on the detection result of the arbitrary angle setting bubble tube 65. The setting operation of the tilting of the laser projector 10 is performed in such manner that the detection result of the arbitrary angle setting bubble tube 65 indicates the horizontal direction. The operation is the same as the operation of the case where leveling operation is performed based on the fixed bubble tubes 20 and 21, and detailed description is not given here.

FIG. 29 shows the condition where the setting operation of the tilt reference plane has been completed. When the setting operation of the tilt reference plane is completed, the tilting base plate 62 is at a horizontal position.

A coincident operation of the fixed bubble tube 20 and the arbitrary angle setting bubble tube 65 is performed to guarantee the accuracy of tilting operation of the tilting base plate 62. This may be performed each time the tilting operation is carried out or after it has been repeated by a given times.

FIG. 32 shows an example of a controller 96 where the arbitrary angle setters 81 and 82 are incorporated. The tilting of the tilting base plate 62 is supported by the tilting of two axes of X-Y, and the numerical values thus set are displayed on the display units 97 and 98.

In the above, description has been given under the assumption that adjustment is already completed as to in which direction the reference plane formed by the reference laser beam 77 is tilted. Actually, however, an operation is first performed to accurately set in a direction (in a horizontal direction), in which it is wanted to direct the laser irradiation unit 4 of the laser survey instrument.

In the past, the operation to set in a direction to be tilted has been performed by using a collimator 75 mounted on the upper surface of the laser irradiation unit 4 as shown in FIG. 25. The tilting direction of the tilt setting mechanism in the laser irradiation unit 4 is designed as parallel to the longitudinal direction of the bubble tube for setting and detecting the tilting. Similarly, the collimating direction of the collimator 75 is also designed as to be in parallel. The direction of the laser irradiation unit 4 is also aligned with this. The operation to set the collimator 75 in a direction to be tilted is entirely an operation to rotate or move the laser irradiation unit 4 and to turn the tilting direction of the tilt setting mechanism in the laser irradiation unit 4 and the bubble tube in a given direction. Normally, the laser irradiation unit 4 is mounted on a tripod, and description is given now on operation on the tripod.

An object (not shown) such as a target is installed in advance in a direction, in which the tilting is to be set. By setting the laser survey instrument main body accurately face-to-face to the object using the collimator 75, the direction of the laser irradiation unit 4 is set to a direction, in which it is to be tilted.

The screws (not shown) to fix the laser irradiation unit 4 are loosened, and the laser irradiation unit 4 is rotated. By collimating the object using the collimator 75, the direction of the laser irradiation unit 4 is accurately set to the object.

As it is evident from the above description, the setting of a tilt angle (an angle of elevation) in a series of setting operations of the laser survey instrument is based on the horizontal plane as reference and is performed according to the tilt information electrically detected by the tilt detector such as a bubble tube, and there is no intervention of man-made errors from the person who performs surveying. Therefore, the tilt angle can be set at high accuracy.

However, in the operation to set the laser irradiation unit 4 in a direction to be tilted, the collimator 75 is used, and it is up to man-made or artificial judgment of the survey or to judge whether it actually agrees or not. Further, the collimator 75 originally performs collimation without requiring high-grade technique, and unlike a collimating telescope, its collimation accuracy is not very high. For this reason, in the direction setting using the collimator 75, man-made errors also intervene in addition to low accuracy of the collimator 75 itself, and the setting of direction is not performed at high accuracy. In the conventional type civil engineering work which does not require very high accuracy, there has been no problem in the direction setting by the collimator 75, while, in the highly mechanized civil engineering work performed in recent years, high accuracy is required, and the problem of accuracy arises.

SUMMARY OF THE INVENTION

It is an object of the present invention to provide a laser survey instrument, by which it is possible, in case an angle of elevation of the laser survey instrument is set, to eliminate man-made errors and to perform direction setting of the laser survey instrument at high accuracy and automatically.

The laser survey instrument according to the present invention comprises at least an object reflector detecting unit for irradiating a detection laser beam, a main body rotating unit for rotating the object reflector detecting unit, and an object reflector for reflecting the detection laser beam toward the object reflector detecting unit, wherein the object reflector detecting unit comprises a light emitter for emitting the detection laser beam, a rotator for irradiating the laser beam for reciprocal scanning, a reflection light detecting unit for receiving and detecting the laser beam reflected from the object reflector, and a scanning controller for controlling the rotator. The present invention also provides a laser survey instrument, which comprises at least a laser irradiation unit for irradiating a reference laser beam, an object reflector detecting unit for irradiating a detection laser beam in the same direction as that of the reference laser beam integrally provided with the laser irradiation unit and a main body rotating unit having rotating means for rotating the object reflector detecting unit and a rotation control unit for controlling the rotating means, and an object reflector for reflecting the detection laser beam toward the object reflector detecting unit, whereby said object reflector detecting unit comprises a light emitter for emitting said detection laser beam, a rotator for irradiating the laser beam for reciprocal scanning, and a reflection light detecting unit for receiving and detecting the laser beam reflected from said object reflector, and said rotation control unit controls said rotating means based on the light receiving (photodetecting) condition of the reflection light detecting unit so that the detection laser beam is directed toward the object reflector. The laser survey instrument according to the present invention, wherein a laser irradiation unit for tilting an irradiating reference laser beam and for forming a reference plane by rotating and irradiating the reference laser beam, said object reflector detecting unit is integrated with said laser irradiation unit, said object reflector detecting unit irradiates a detection laser beam in the same tilt direction as that of the reference laser beam, said object reflector detecting unit tilts an irradiating detection laser beam and irradiates the detection laser beam in a tilt direction, said main body rotating unit comprises rotating means for rotating the object reflector detecting unit and a rotation controller for controlling said rotating means, and said rotation controller controls said rotating means to direct said detection laser beam toward the object reflector based on photodetecting conditions of said reflection detecting unit. The present invention also provides a laser survey instrument, comprising a laser irradiation unit, which has tilting means for tilting the reference laser beam with respect to a horizontal plane. The invention further provides a laser survey instrument, wherein the object reflector detecting unit comprises optical means for irradiating the detection laser beam by spreading it in fan-like shape in a vertical direction. The invention also provides a laser survey instrument, wherein the object reflector detecting unit is capable of irradiating the detection laser beam for reciprocal scanning in horizontal and vertical directions. The invention also provides a laser survey instrument, wherein the object reflector detecting unit comprises a vertical laser beam emitter for irradiating a vertical laser beam in a vertical direction and a vertical compensator to direct the vertical laser beam irradiated from the vertical laser beam emitter toward a vertical direction. The invention further provides a laser survey instrument, wherein the tilting direction of the tilting means of the laser irradiation unit and the direction of the detection laser beam from the object reflector detecting unit form a given angle. The present invention also provides a laser survey instrument, wherein the object reflector detecting unit can be attached to or removed from the laser irradiation unit. The invention also provides a laser survey instrument, wherein the main body rotating unit can be attached to or removed from the laser irradiation unit. The invention also provides a laser survey instrument, wherein there is provided a main body rotating unit for rotating the laser irradiation unit and the object reflector detecting unit and the main body rotating unit can be attached to or removed from the laser irradiation unit. Further, the present invention provides a laser survey instrument, wherein the main body rotating unit comprises rotation restraining means, manual rotating means for converting the rotation of a rotating knob to the rotation of the object reflector detecting unit, and means for allowing rotation when a force higher than a given rotating force is applied. The present invention provides a laser survey instrument, wherein the object reflector detecting unit is mounted on the laser irradiation unit, and the laser irradiation unit is mounted on the main body rotating unit. The present invention provides a laser survey instrument, wherein the laser irradiation unit is mounted on the object reflector detecting unit, and the object reflector detecting unit is mounted on the main body rotating unit.

According to the present invention, therefore, the object reflector detecting unit detects the position of the object reflector and the irradiating direction of the reference laser beam of the laser irradiation unit is automatically set. This makes it easy to form a reference line and a reference plane by the laser beam and to improve working efficiency and accuracy.

BRIEF DESCRIPTION OF THE DRAWINGS

FIG. 11 represents drawings to explain operations of the reflection light detection circuit;

DETAILED DESCRIPTION OF THE PREFERRED EMBODIMENTS

In the following, description will be given on an embodiment of the present invention, referring to the attached drawings.

In the present invention, an object (an object reflector 168) is installed in a direction to be tilted. A laser beam irradiation unit 1 irradiates a detection laser beam 170 toward the object reflector 168, and the detection laser beam 170 reflected from the object reflector 168 is recognized by the laser beam irradiation unit 1 itself. The direction of the tilting of the laser beam irradiation unit 1 with respect to the object reflector 168, more substantially, the direction of the tilting of a built-in tilt setting mechanism, is corrected.

Figure 25:
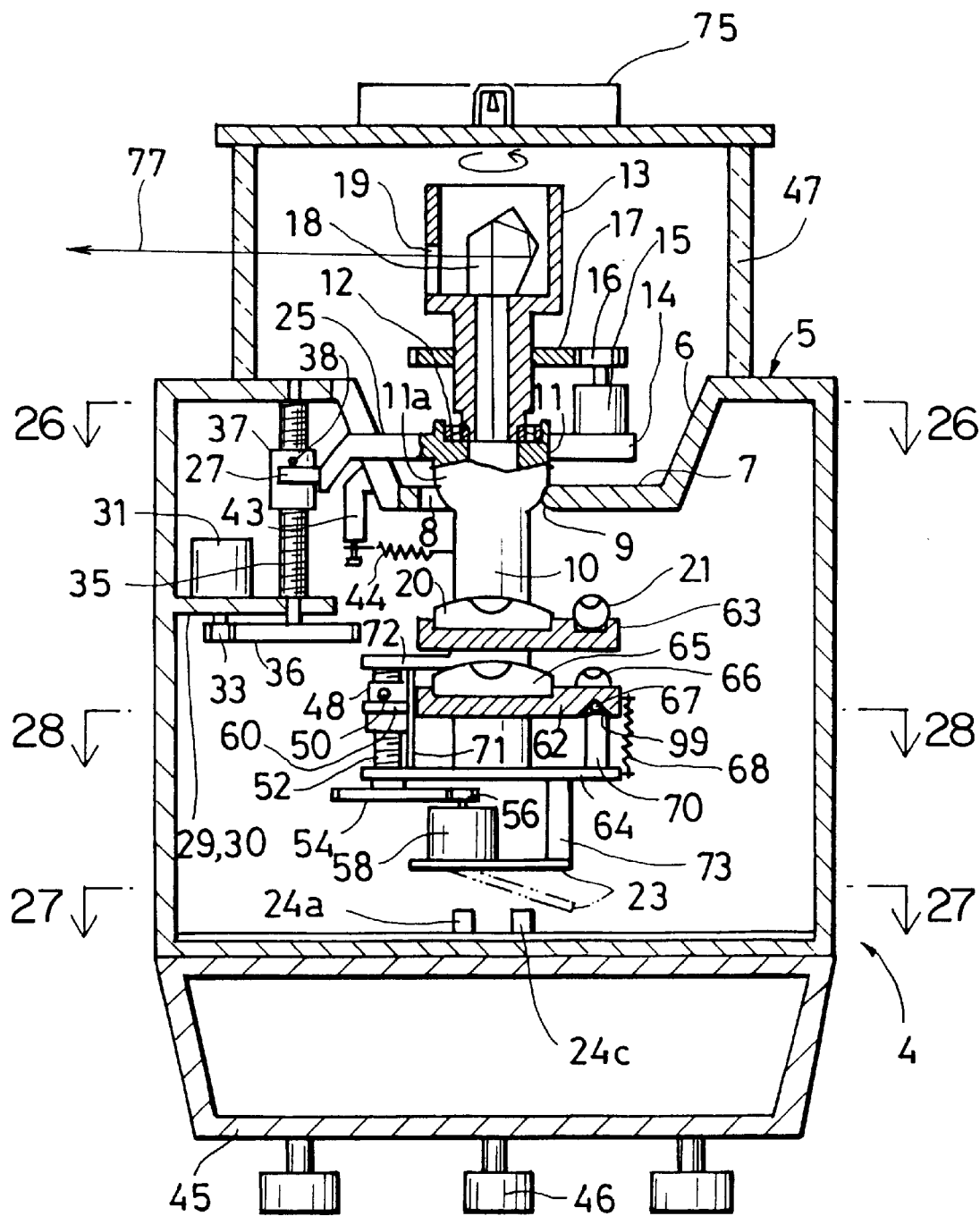
FIG. 25 is a cross-sectional view of a conventional type instrument.
Figure 26:
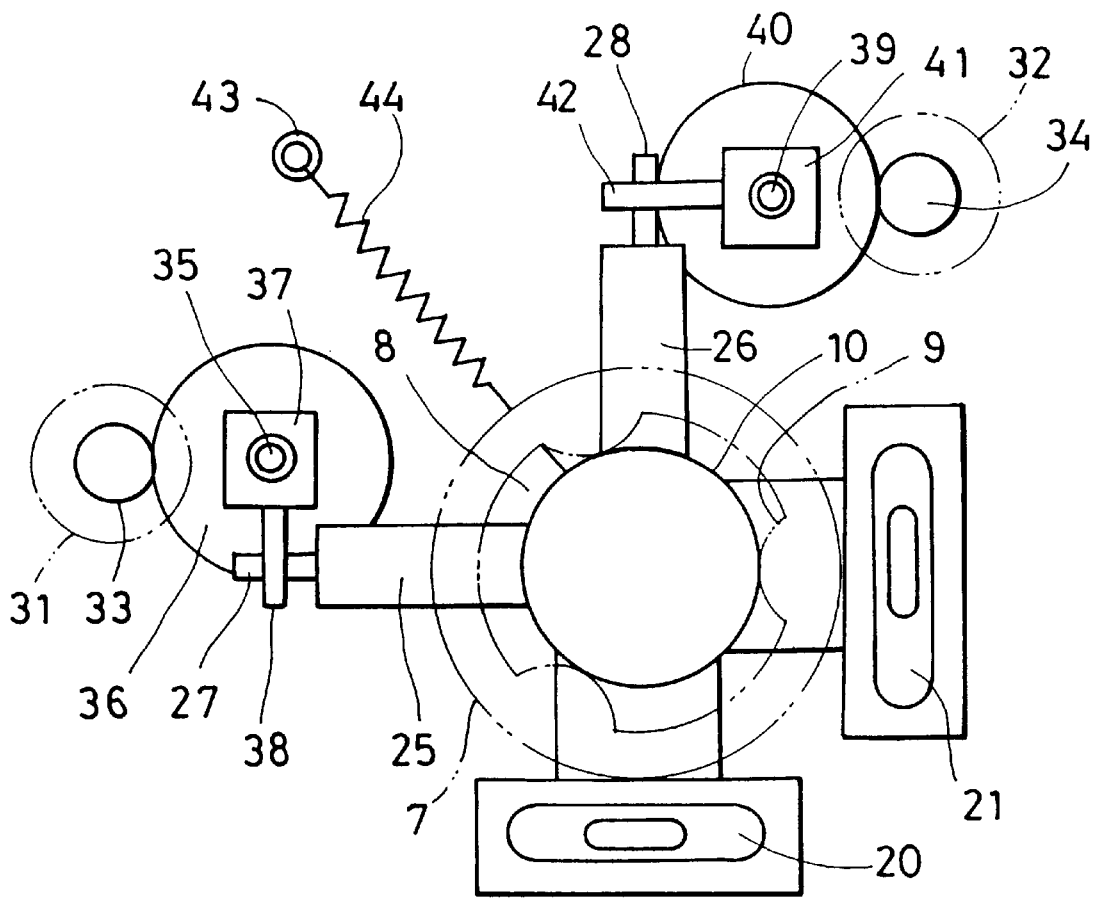
FIG. 26 is an arrow diagram along the line 26—26 of FIG. 25.
Figure 27:
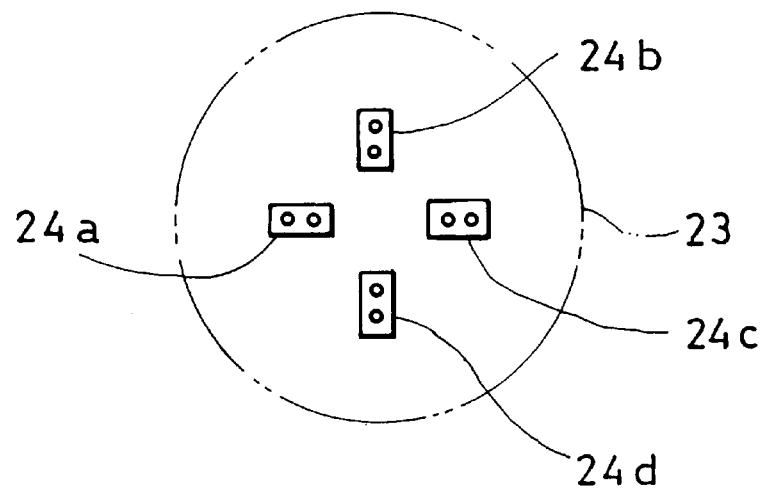
FIG. 27 is an arrow diagram along the line 27—27 of FIG. 25.
Figure 28:
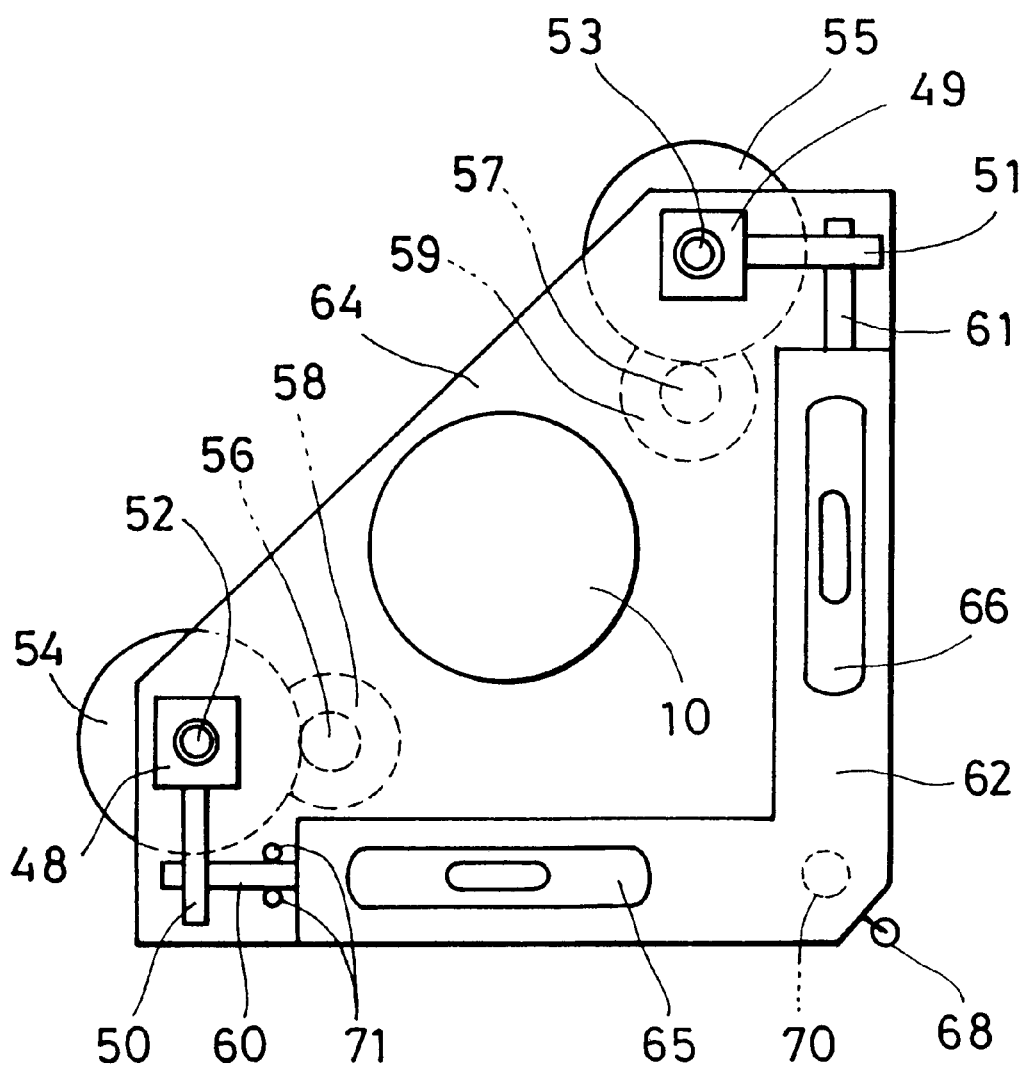
FIG. 28 is an arrow diagram along the line 28—28 of FIG. 25.

The laser beam irradiation unit 1 comprises a laser irradiation unit 4, an object reflector detecting unit 3 mounted on the upper portion of the laser irradiation unit 4, and a main body rotating unit 151 mounted on the lower portion of the laser irradiation unit 4. The object reflector detecting unit 3 irradiates the laser beam 170 for detecting the object reflector 168 toward the object reflector 168, and the laser irradiation unit 4 irradiates a reference laser beam 77 (see FIG. 25) to form a reference line or a reference plane. The detection laser beam 170 irradiated by the object reflector detecting unit 3 is directed in the same direction as the tilting direction of the tilt setting mechanism of the laser irradiation unit 4. The laser irradiation unit 4 is the same as the one shown in FIG. 25, and detailed description is not given here.

The main body rotating unit 151 is mounted on a tripod base (not shown), and the laser irradiation unit 4 is mounted on the base via the main body rotating unit 151. The main body rotating unit 151 is fixed on a tripod mounting screw 152 provided on the lower surface of a battery box 45 by means of a fixing screw 159.

A rotation frame 154 is rotatably mounted on a hollow type fixation frame 156 via bearings 155. At the center of the rotation frame 154, a hollow shaft 153 protruding downward is mounted, and the shaft 153 rotatably penetrates the fixation frame 156. A rotating gear 157 is fixed on the shaft 153. Further, a pattern ring 158a of an encoder 158 is fixed on the shaft 153, and a detection unit 158b of the encoder 158 is mounted on the fixation frame 156 side.

A rotation motor 160 is provided on the bottom surface of the fixation frame 156, and an output gear 161 mounted on the output shaft of the rotation motor 160 is engaged with the rotating gear 157. The encoder 158 comprising the pattern ring 158a and the detecting unit 158b is arranged between the rotation frame 154 and the fixation frame 156, and a relative rotation angle between the rotation frame 154 and the fixation frame 156 is detected by the encoder 158, and the detected rotation angle is inputted to a rotation controller 169 provided on the fixation frame 156. The rotation motor 160 is driven by the rotation controller 169, which also controls the rotation.

The fixing screw 159 penetrating the main body rotating unit 151 from below is screwed into the tripod mounting screw 152, thereby combining the laser irradiation unit 4 and the main body rotating unit 151 together. On the fixing screw 159, a screw hole for mounting the tripod is formed from below, thereby fixing the tripod (not shown) via the screw hole. The laser irradiation unit 4 is rotated by the rotation motor 160 with respect to the main body rotating unit 151, and rotation angle is detected by the encoder 158.

Figure 3:
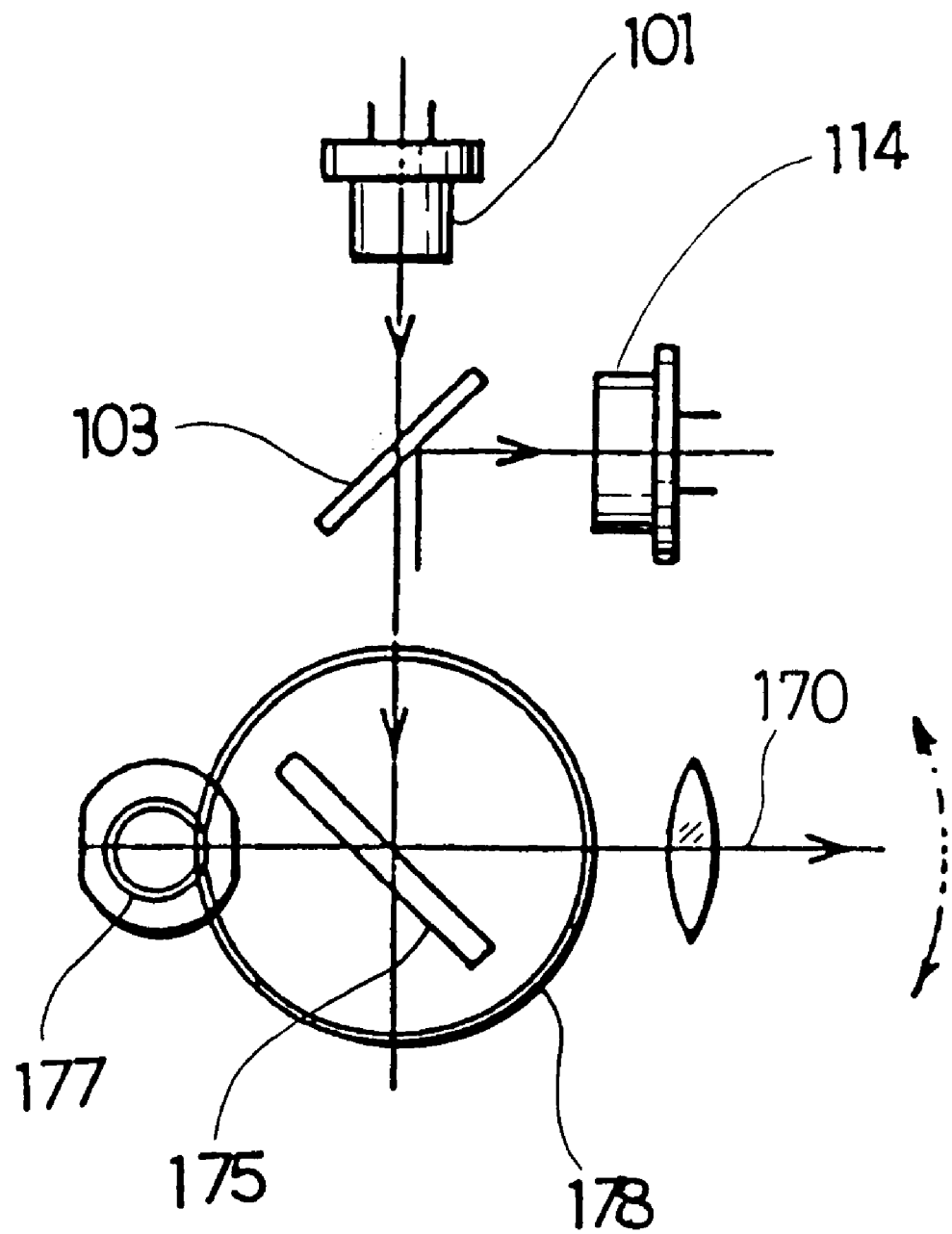
FIG. 3 is a schematical drawing of a part of an object reflector detecting unit of the laser survey instrument.
Figure 4:
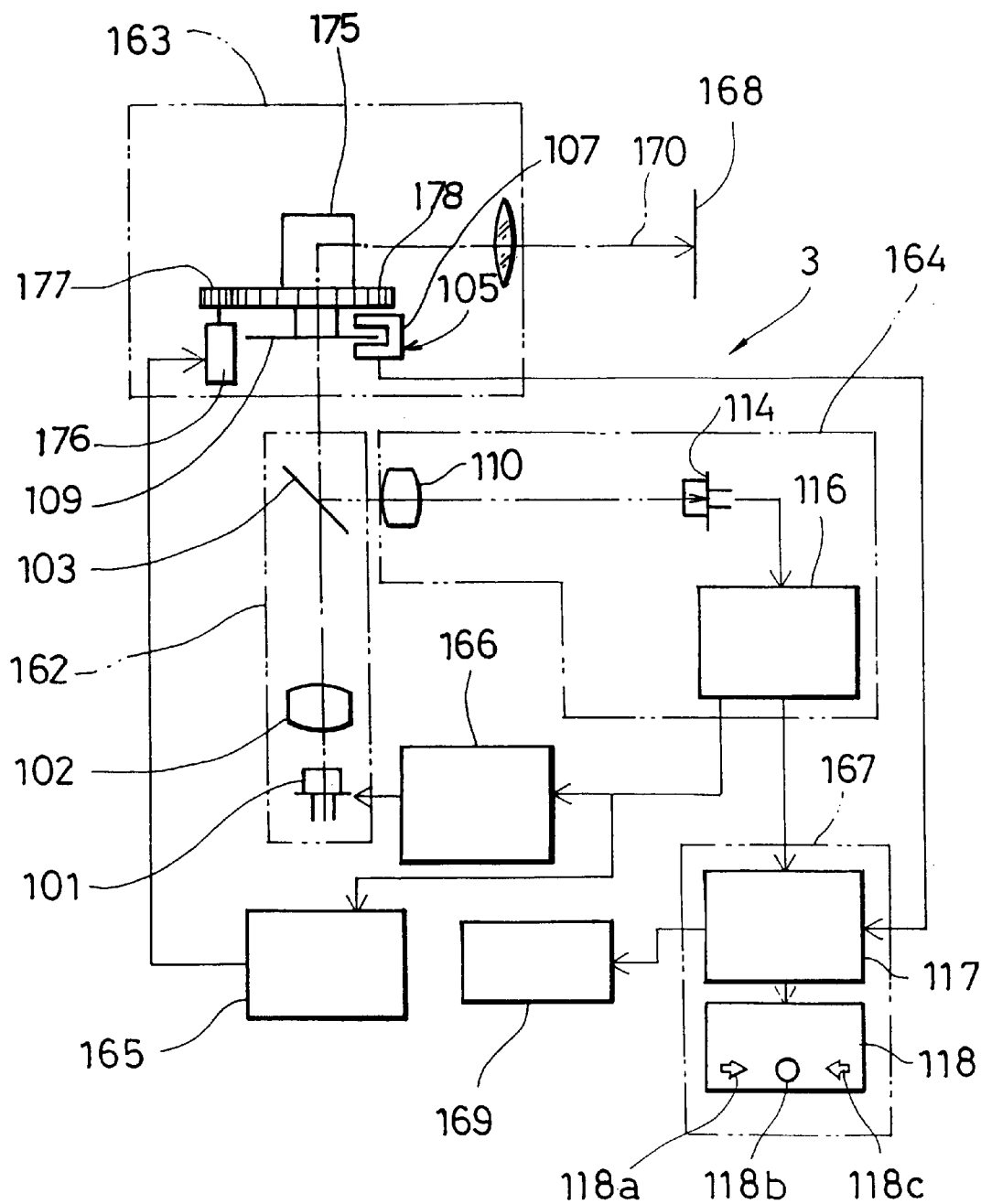
FIG. 4 is a block diagram showing an optical system and a control system of the above embodiment.

Next, description will be given on the object reflector detecting unit 3 referring to FIG. 3 and FIG. 4. The object reflector detecting unit 3 comprises a light emitter 162, a rotator 163, a reflection light detector 164, a scanning controller 165, a light emitting element driver 166, and an alignment display unit 167.

First, the light emitter 162 is described. On the optical axis of a laser diode 101, a collimator lens 102 and a perforated mirror 103 are arranged in this order as seen from the laser diode 101, and the laser beam emitted from the laser diode 101 is turned to parallel beams by the collimator lens 102, and it is irradiated toward the rotator 163 after passing through the perforated mirror 103. The laser diode 101 emits a light beam by the light emitting element driver 166. The light beam is modulated by the light emitting element driver 166 so that the laser beam emitted from the laser diode 101 can be distinguished from other external light.

The rotator 163 irradiates and scans the detection laser beam 170 emitted from the light emitter 162 in a horizontal direction. A mirror 175 for deflecting the optical axis of the laser beam from the light emitter 162 by 90° is rotatably supported around the optical axis of the light emitter 162 and is rotated by a scanning motor 176 via a gear 177 and a scanning gear 178. An encoder 105 is provided in such manner that it is integrally rotated with the mirror 175.

The encoder 105 comprises a rotor 109 and a detector 107, and it is an incremental encoder provided with an index to indicate reference position. By counting an output from the reference position indicated by the index, an angle from the reference position can be detected. When the index to indicate the reference position is detected, the irradiating direction of the laser beam agrees with the tilting direction of the tilt setting mechanism or the irradiation direction agrees with predetermined positional relationship. The predetermined positional relationship is, for example, 90° direction or 180° direction. Reciprocal scanning is performed at approximately the same angle around the tilting direction.

Figure 5A:
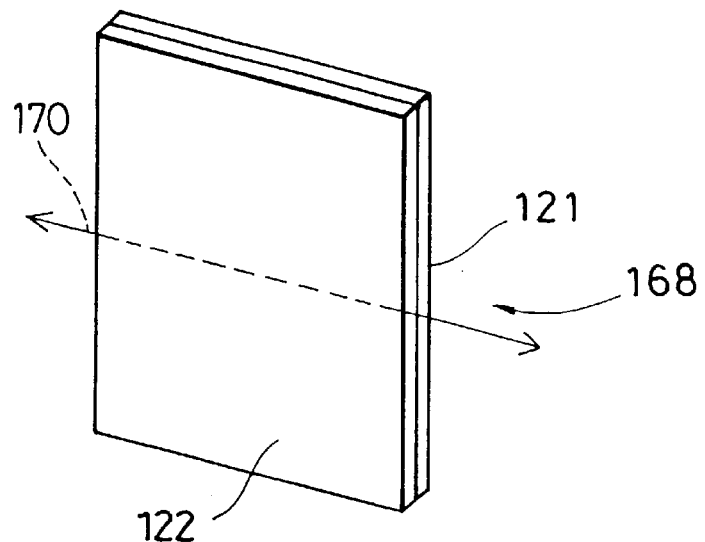
FIG. 5 (A) and FIG. 5 (B) each represents an example of an object reflector.
Figure 5B:
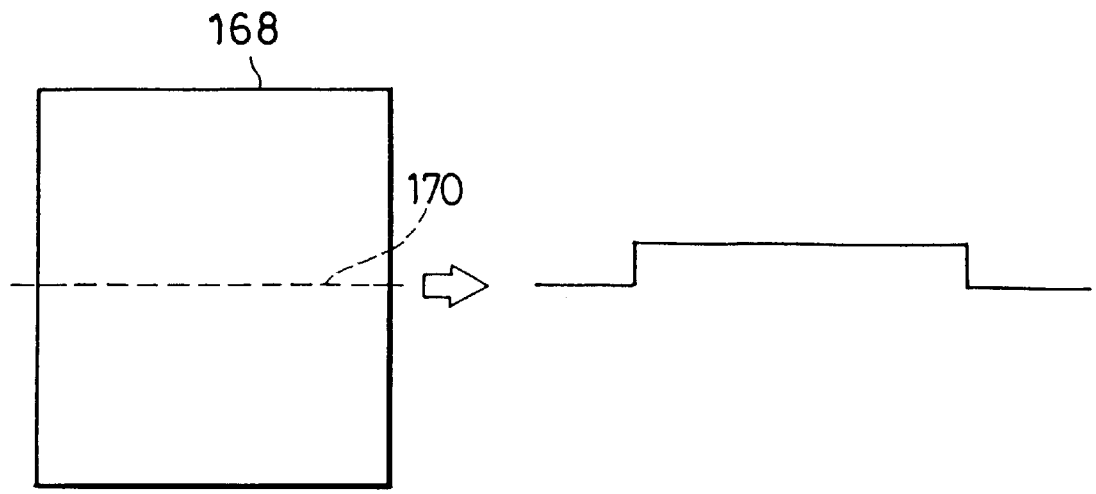

It is designed in such manner that the object reflector 168 reflects the laser beam toward the rotator 163 when the detection laser beam 170 from the rotator 163 is irradiated. The object reflector 168 is, for example, as shown in FIG. 5 (A) or FIG. 6 (A). In the object reflector 168 shown in FIG. 5 (A), a reflection layer 122 is formed on a base plate 121, and the light beam from the rotator 163 is reflected so that the light enters the rotator 163 again. The reflection layer 122 is a retroreflection surface comprising beads, very small prisms, etc. In the object reflector 168 shown in FIG. 6 (A), reflection layers 122 are arranged on both lateral edges of a base plate 121. There are provided two reflection layers in order that the reflection light from the object reflector 168 can be easily distinguished from the reflection light from other unnecessary reflector.

Figure 6A:
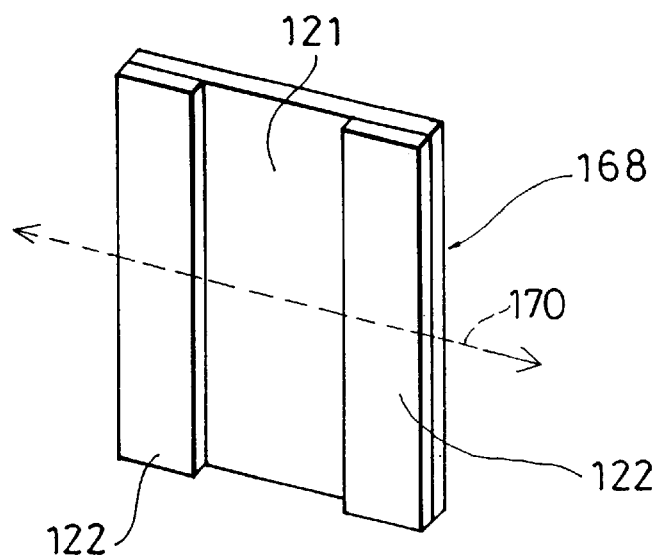
FIG. 6 (A) and FIG. 6 (B) each represents an example of another type of the object reflector.
Figure 6B:
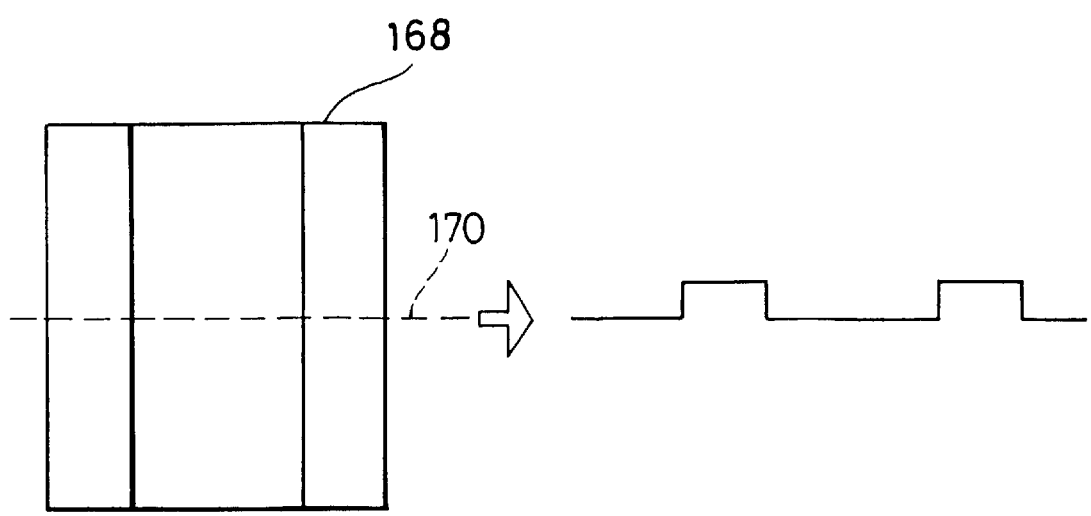
Figure 7A:
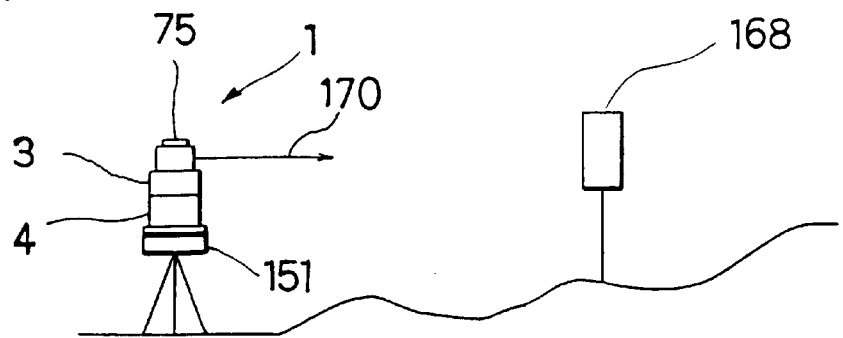
FIG. 7 (A), FIG. 7 (B), FIG. 7 (C) and FIG. 7 (D) each represents a drawing to explain operation of the embodiment.
Figure 7B:
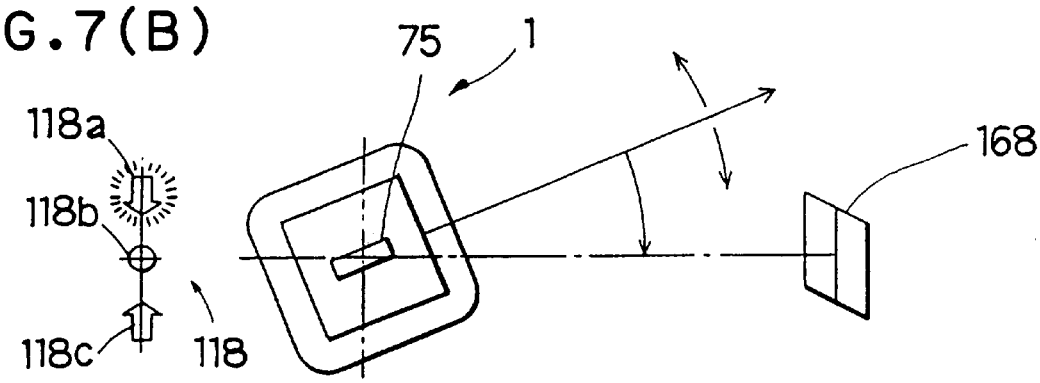
Figure 7C:
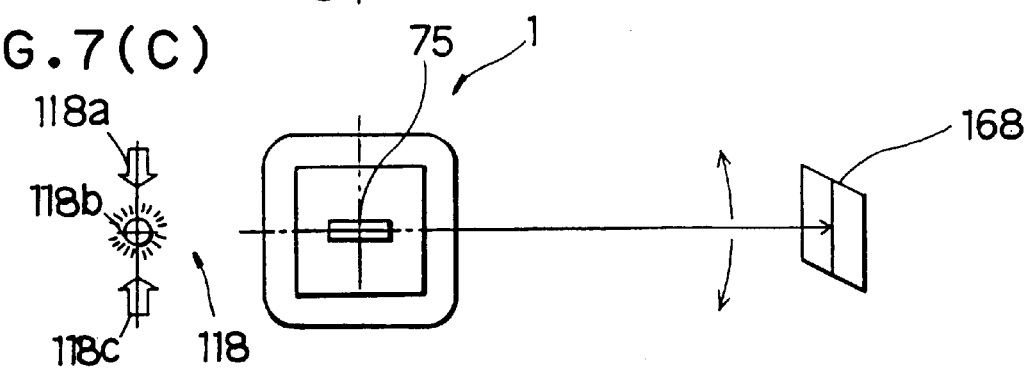
Figure 7D:
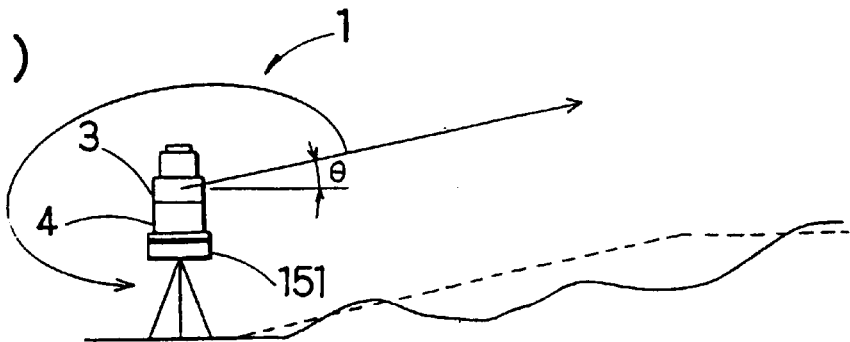

When the object reflector 168 shown in FIG. 5 (A) is scanned by the detection laser beam 170, the reflected laser beam from the object reflector 168 is turned to pulse-like shape with the same width as that of the object reflector 168 as show in FIG. 5 (B). When the object reflector 168 as shown in FIG. 6 (A) is scanned by the detection laser beam 170, the reflected laser beam from the object reflector 168 is turned to have two-pulse shape as shown in FIG. 6 (B), lacking the middle portion compared with the one shown in FIG. 5 (B).

The reflection laser beam from the object reflector 168 enters the mirror 175 and is then deflected toward the perforated mirror 103. The perforated mirror 103 deflects the reflection laser beam toward the reflection light detector 164.

Next, description will be given on the reflection light detector 164.

On an optical axis of the reflection light of the perforated mirror 103, a condenser lens 110 and a first photodetector 114 comprising components such as a photodiode are arranged in this order as seen from the perforated mirror 103 so that the first photodetector 114 receives the reflection laser beam from the object reflector 168, and the output from the first photodetector 114 is inputted to a reflection light detection circuit 116. The reflection light detection circuit 116 is equipped with an electrical filter (not shown) for detecting a photodetection signal of the laser beam. Of the photodetection signals coming from the first photodetector 114, a modulated laser beam is extracted and detected, and distinguished from other external light. Further, the signal is processed by signal processing such as amplification to be described, and it is outputted to the alignment display unit 167.

The alignment display unit 167 comprises a position identifier 117 and a display unit 118. To the position identifier 117, a signal showing a photodetection condition of the first photodetector 114 from the reflection light detection circuit 116 is inputted, and an angle signal from the encoder 105 to detect a rotating position of the mirror 175 on the rotator 163 is also inputted. The angle signal from the encoder 105 is an angle signal of the encoder 105, which matches the photodetecting condition when the reflection laser beam from the object reflector 168 is received. Therefore, by obtaining the signal of the encoder 105 and the angle signal from the reference position, at the time of rise-up and falling of the signal (see FIG. 5 (B)) obtained by receiving of the reflection laser beam from the object reflector 168 shown in FIG. 5, the weighted position of the object reflector 168, i.e. the central position of the object reflector 168, can be easily obtained.

Also, for the object reflector 168 shown in FIG. 6, by obtaining the signal of the encoder 105 and the angle signal from the reference position, at the time of rise-up and falling of the signal (see FIG. 6 (B)) obtained by receiving of the reflection laser beam, the weighted position of the object reflector 168, i.e. the central position of the object reflector 168, can be obtained.

From the photodetection signal of the reflection light detection circuit 116 and the angle signal from the encoder 105, the position identifier 117 calculates the weighted position of the photosignal, i.e. the central position of the object reflector 168, and the result of calculation is inputted to the display unit 118 and the rotation controller 169. If direction of the laser irradiation unit 4 is deviated, the display unit 118 indicates the direction to be corrected of the laser irradiation unit 4 by direction arrows 118a or 118c. In case the laser irradiation unit 4 correctly faces to the object reflector 168, it is notified by the display sector 118b at the center.

Description will be given now on setting of the tilting direction and formation of the tilt reference plane, referring to FIG. 7.

The object reflector 168 is installed on a measurement slope, and the direction of the laser beam irradiation unit 1 is approximately aligned with the object reflector 168 using the collimator 75 (FIG. 7 (A)). The detection laser beam 170 is irradiated from the object reflector detecting unit 3, and the mirror 175 is reciprocally rotated within a given angular range by the scanning motor 176 to irradiate the irradiation laser beam for reciprocal scanning. The main body rotating unit 151 is driven, and the object reflector detecting unit 3 is rotated via the laser irradiation unit 4. Specifically, the detection laser beam 170 irradiated from the object reflector detecting unit 3 is irradiated for reciprocal total circumferential scanning to detect the object reflector 168.

When the detection laser beam 170 passes through the object reflector 168 and the reflection light from the object reflector 168 is detected by the object reflector detecting unit 3, a positional relationship with the irradiating direction of the detection laser beam 170 is displayed on the display unit 118 using the detected position as a reference. Specifically, in case the irradiating direction is deviated from the reference direction, the display unit 118 turns the arrow 118a on to correct the direction (FIG. 7 (B)). In case the irradiating direction agrees with the reference direction, the display sector 118b is turned on (FIG. 7 (C)).

To correct an error in the tilting direction of the laser beam irradiation unit 1, there is a case where the encoder 105 is provided in the object reflector detecting unit 3 and the encoder 158 is provided on the main body rotating unit 151, and there is also a case where the encoder 158 is not provided on the main body rotating unit 151. First, description will be given on the case where the encoder 158 is provided. When the object reflector detecting unit 3 irradiates a laser beam for reciprocal scanning and detects the object reflector 168, the error from the tilting direction of the laser beam irradiation unit 1 is calculated from the output of the encoder 105, and it is outputted to the main body rotating unit 151. Based on the output signal from the object reflector detecting unit 3, the main body rotating unit 151 is rotated in a direction to correct the error. The amount of rotation is calculated from the encoder 158.

Next, description will be given on the correction of the error in case the encoder 158 is not provided on the main body rotating unit 151. When the object reflector detecting unit 3 irradiates a laser beam for reciprocal scanning of the object reflector 168, a rise-up or a falling detection signal is obtained from the object reflector 168. If the index is positioned at the center of the position of the detection signal on the encoder 105, it is the tilting direction of the laser beam irradiation unit 1. Then, the main body rotating unit 151 should be rotated so that the index signal is aligned with the center of the detection signal. However, it is necessary to perform a feedback operation by repeating detection and rotation.

Figure 29:
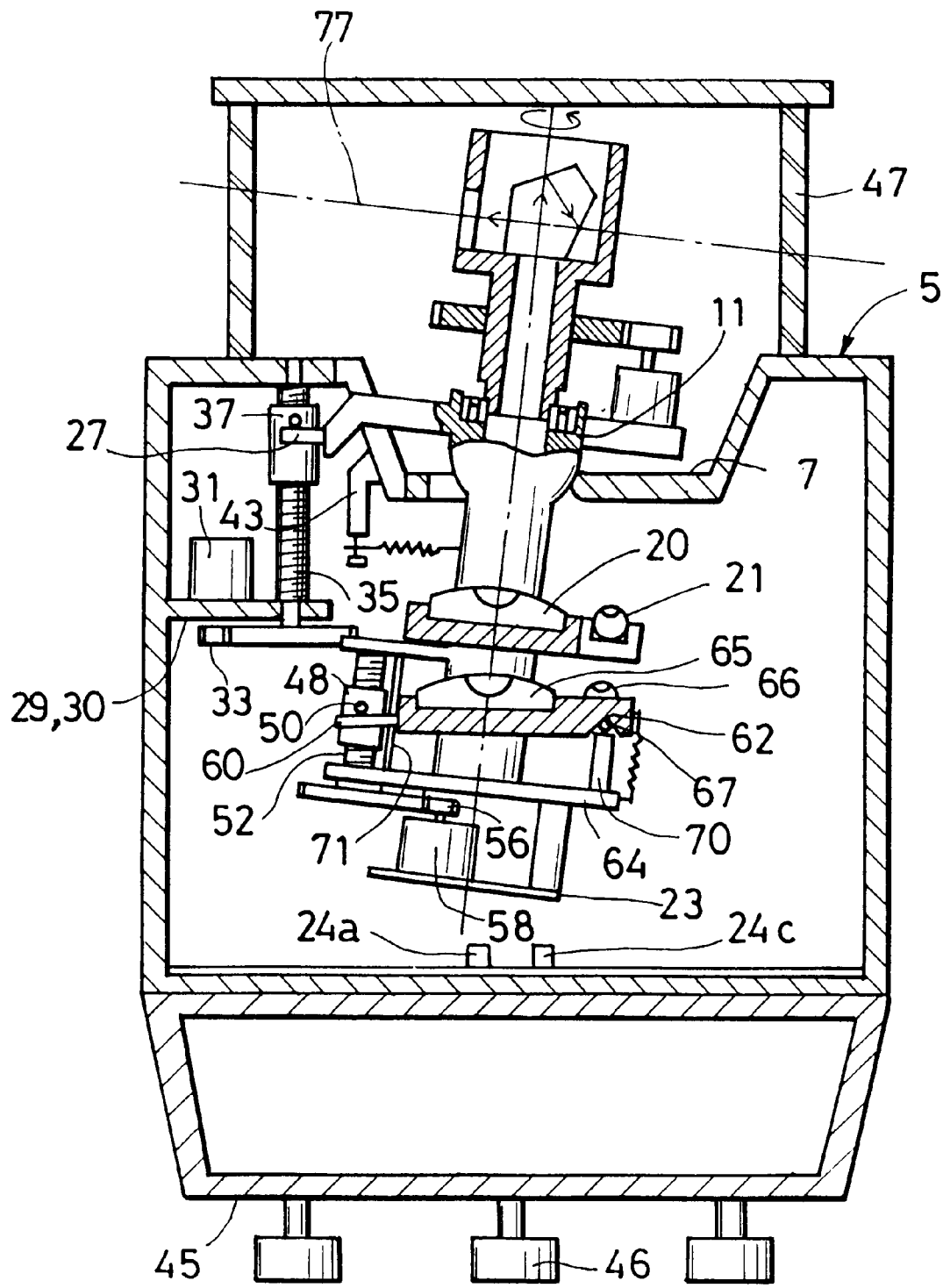
FIG. 29 is a drawing to explain an operation of the conventional type instrument.
Figure 30:
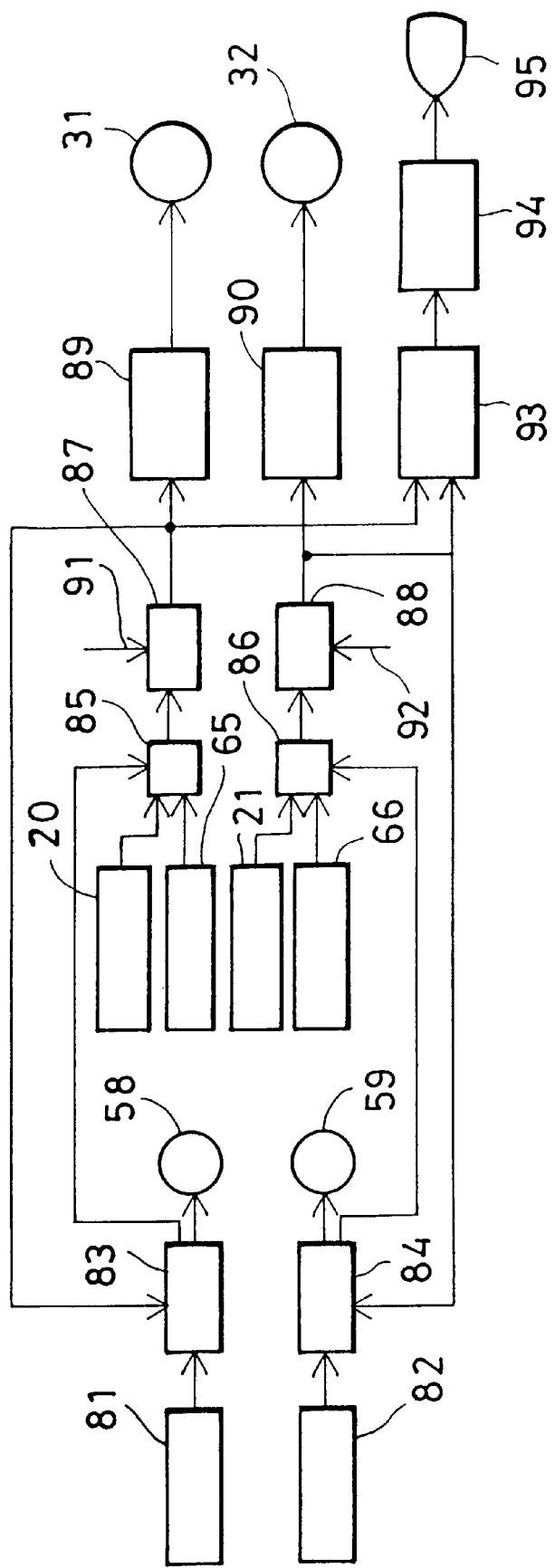
FIG. 30 is a block diagram of a control system of the conventional type instrument.
Figure 31:
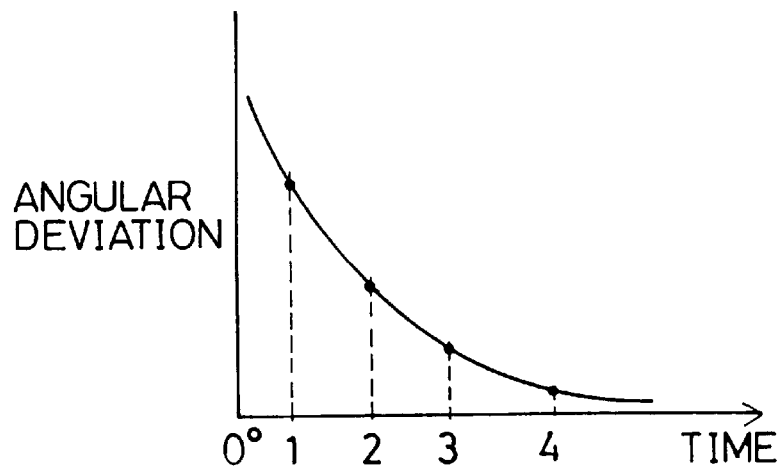
FIG. 31 is a diagram showing a condition of leveling.
Figure 32:
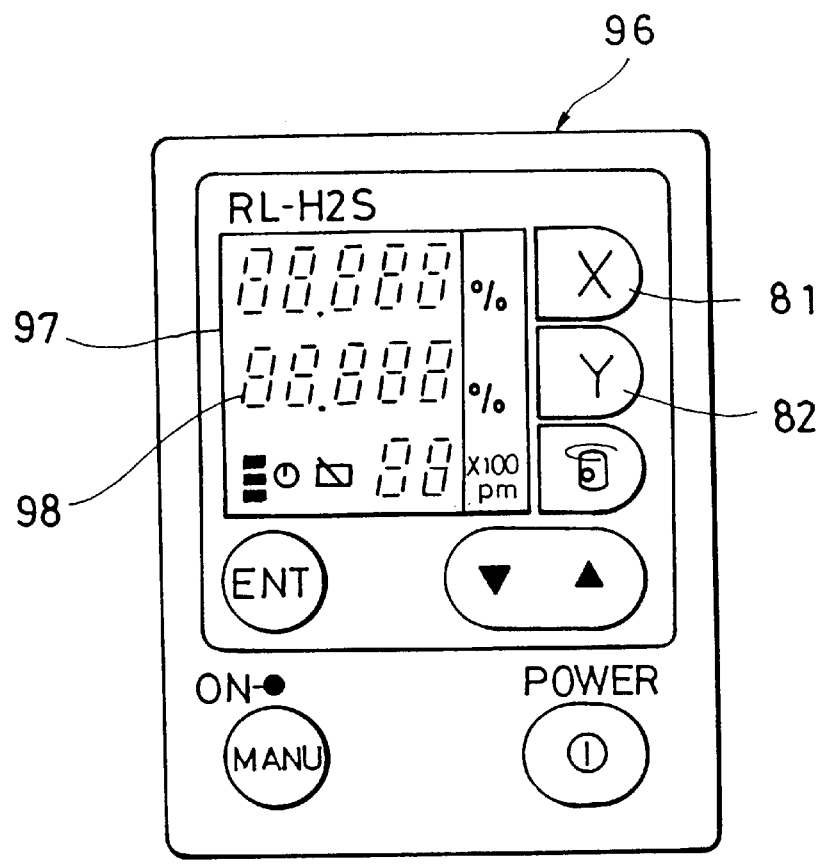
FIG. 32 is an illustration of an example of a controller.

When the irradiating direction of the detection laser beam 170 agrees with the reference direction, a tilt angle of the laser beam in the reference direction is set by the tilt setting mechanism of the laser irradiation unit 4. When the setting of the tilt angle is completed, the scanning motor 15 (see FIGS. 25 and 29) on the laser irradiation unit 4 is driven, and the reference laser beam is irradiated for all-round scanning, and a tilt reference plane is formed (FIG. 7 (D)). It has been described that the tilt reference plane is formed after the setting of the tilting direction, while the reference plane may be set at first. Even when a deviation occurs on the reference plane after the setting of the tilting direction, it can be easily corrected. In case directions are aligned approximately, the amount of correction is small.

Figure 8:
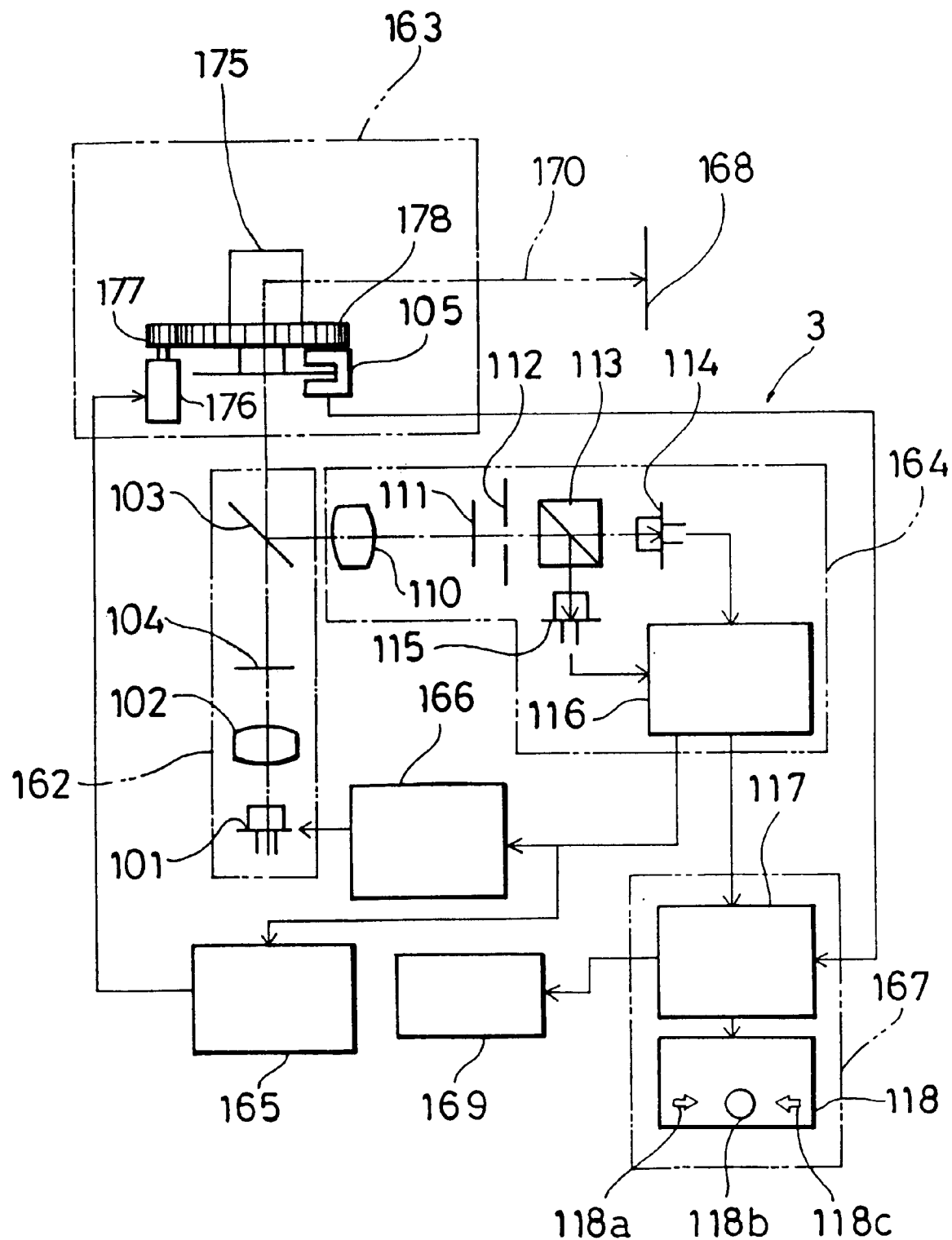
FIG. 8 is a block diagram showing an optical system and a control system of a second embodiment of the present invention.
Figure 10:
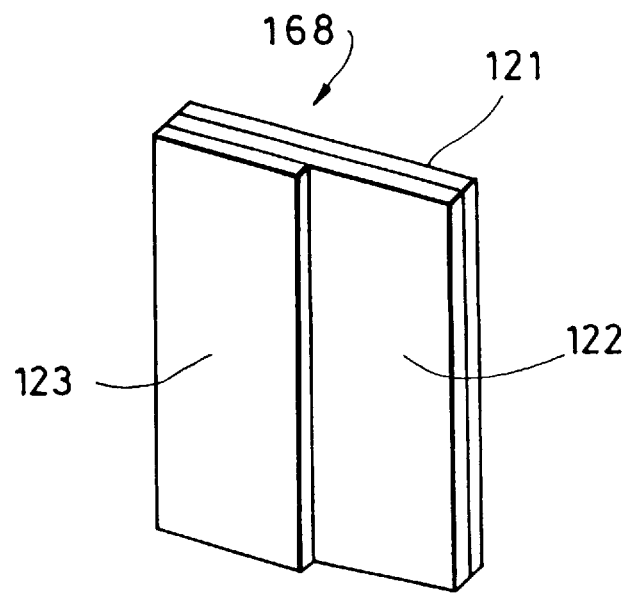
FIG. 10 is a perspective view of an object reflector used in the second embodiment.

Description will be given next on a second embodiment of the present invention, referring to FIG. 8. In the object reflector 168 of the second embodiment, the reflection layer 122 is formed on the base plate 121 as shown in FIG. 10. On the left half of the reflection layer 122 in the figure, a $\lambda/4$ birefringence member 123 is attached. For example, the exposed portion of the reflection layer 122 serves as a polarization maintaining reflection sector to reflect the light beam while maintaining direction of polarization of the incident beam, and the $\lambda/4$ birefringence member 123 serves as a polarization converting reflection sector to reflect the light beam by converting direction of polarization with respect to the incident beam so that the direction of polarization differs between the laser beams coming from these two sectors.

The reflection layer 122 is made of retroreflection material, and a plurality of very small corner cubes or spherical reflectors are arranged on it. The $\lambda/4$ birefringence member 123 has such effect that the polarized reflection beam has a phase difference of $\lambda/4$ with respect to the incident beam.

Next, description will be given on the object reflector detecting unit 3 in the second embodiment.

On the optical axis of a laser diode 101, which emits a linearly polarized laser beam, a collimator lens 102, a first $\lambda/4$ birefringence member 104, and a perforated mirror 103 are arranged in this order as seen from the laser diode 101. The linearly polarized laser beam emitted from the laser diode 101 is turned to parallel beams by the collimator lens 102 and is converted to circularly polarized light by the first $\lambda/4$ birefringence member 104. The circularly polarized light beam passes through the perforated mirror 103 and is irradiated toward the rotator 163. The rotator 163 irradiates the laser beam coming from the light emitter 162 toward the reference plane for scanning.

To the rotator 163, the polarized reflection laser beam from the object reflector 168 is irradiated. Upon entering the mirror 175, the polarized reflection laser beam is deflected toward the perforated mirror 103, which irradiates the polarized reflection laser beam toward the reflection light detector 164.

Next, the reflection light detector 164 will be described.

On the reflection light optical axis of the perforated mirror 103, a condenser lens 110, a second $\lambda/4$ birefringence member 111, a pinhole 112, a polarization beam splitter 113, and a first photodetector 114 comprising components such as a photodiode are arranged in this order as seen from the perforated mirror 103. On the reflection light optical axis of the polarization beam splitter 113, a second photodetector 115 comprising components such as a photodiode is arranged. The outputs from the first photodetector 114 and the second photodetector 115 are inputted to the reflection light detection circuit 116.

The polarization beam splitter 113 splits the polarized reflection laser beam entering the reflection light detector 164 and irradiates it to the first photodetector 114 and the second photodetector 115. The second $\lambda/4$ birefringence member 111 and the polarization beam splitter 113 are arranged in such manner that the polarized reflection laser beam, as emitted from the light emitter 162 and returning to the main unit after passing through the $\lambda/4$ birefringence member 123 twice, enters the first photodetector 114, and that the laser beam, coming from the reflection layer 122 and having the different direction of polarization from the polarized reflection laser beam, enters the second photodetector 115.

Figure 9:
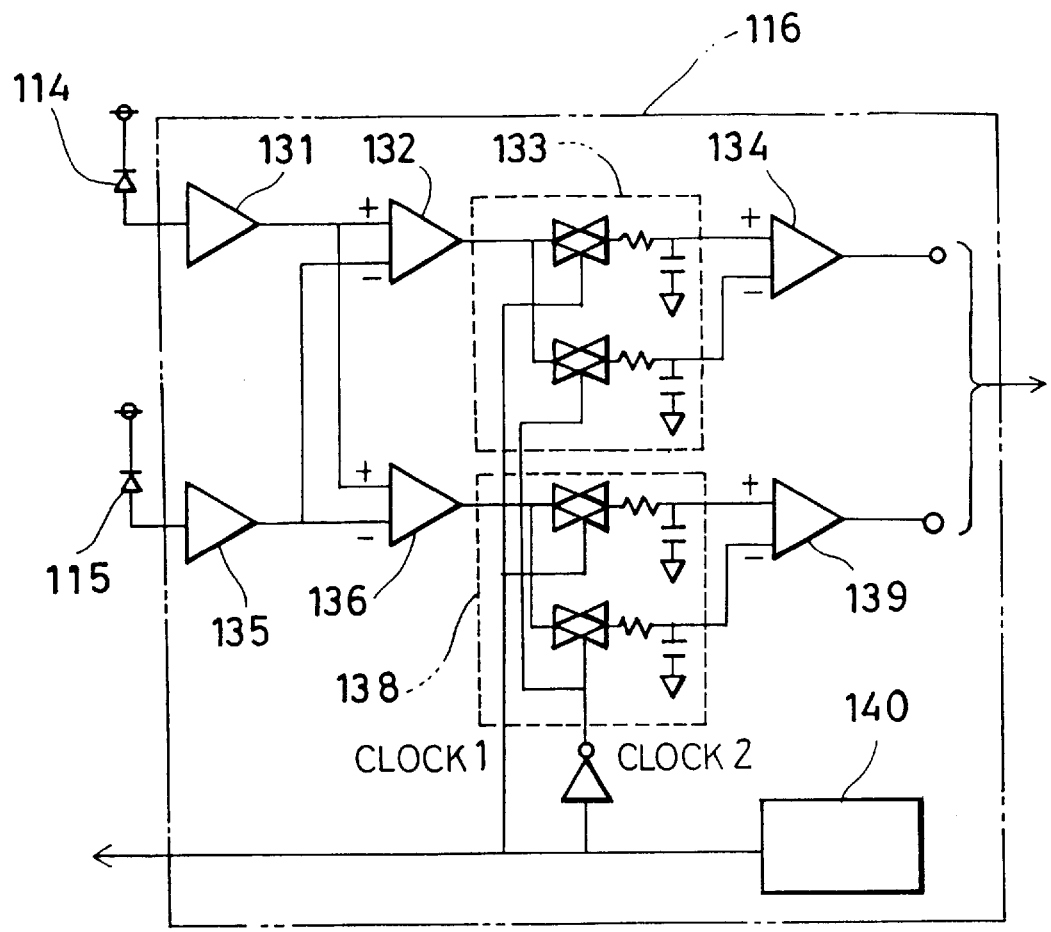
FIG. 9 is a circuit diagram of an example of a reflection light detection circuit of the second embodiment of the invention.

Description will be given on an example of the polarized reflection light detection circuit 116, referring to FIG. 9.

The outputs of the first photodetector 114 and the second photodetector 115 are inputted to a differential amplifier 132 via amplifiers 131 and 135, and output of the differential amplifier 132 is inputted to a differential amplifier 134 via a synchronous detector 133. The outputs of the first photodetector 114 and the second photodetector 115 are inputted to an adding amplifier 136 via the amplifiers 131 and 135, and output of the adding amplifier 136 is inputted to a differential amplifier 139 via a synchronous detector 138. The outputs of the differential amplifiers 139 and 134 are inputted to a scanning controller 165, a light emitting element driver 166, and an alignment display unit 167. Based on a clock signal from the reflection light detection circuit 116, the light emitting element driver 166 performs a pulse modulation on the polarized laser beam emitted from the laser diode 101.

The polarized laser beam emitted from the laser diode 101 driven by the light emitting element driver 166 is modulated based on the clock signal from an oscillator circuit 140. The linearly polarized laser beam emitted from the laser diode 101 is turned to parallel beams by the collimator lens 102, and after passing through the first $\lambda/4$ birefringence member 104, it is turned to circularly polarized laser beam. The circularly polarized laser beam passes through the perforated mirror 103 and is deflected by the mirror 175 to the reference plane.

The mirror 175 is reciprocally scanned by the scanning motor 176 via the gear 177 and the scanning gear 178 within a given angular range. The polarized laser beam irradiated from the mirror 175 scans reciprocally and performs all-round scanning by the main body rotating unit 151.

By the rotary scanning, the polarized laser beam passes through the object reflector 168. When passing through it, the polarized laser beam is reflected by the object reflector 168, and the polarized reflection laser beam enters the mirror 175.

As described above, one-half of the object reflector 168 is merely the reflection layer 122, and the $\lambda/4$ birefringence member 123 is attached on the other half. Therefore, the polarized reflection laser beam reflected by the exposed portion of the reflection layer 122 is circularly polarized light, which maintains polarization condition of the incident polarized laser beam. The polarized reflection laser beam, which passes through the $\lambda/4$ birefringence member 123, reflected by the reflection layer 122 and further passing through the $\lambda/4$ birefringence member 123, is circularly polarized light, which has a phase deviated by $\lambda/2$ with respect to the polarization condition of the incident polarized laser beam. Thus, the direction of polarization differs according to the reflection surface.

The polarized reflection laser beam reflected by the object reflector 168 is deflected by 90° by the mirror 175 and enters the perforated mirror 103. The perforated mirror 103 reflects the reflection laser beam toward the condenser lens 110. The reflection laser beam is turned to convergent light by the condenser lens 110 and enters the second $\lambda/4$ birefringence member 111. Returning as a circularly polarized light, the reflection laser beam is converted to a linearly polarized light by the second $\lambda/4$ birefringence member 111 and enters the pinhole 112. As described above, the phase is deviated by $\lambda/2$ between the reflection laser beam reflected by the exposed portion of the reflection layer 122 and the reflection laser beam reflected by the $\lambda/4$ birefringence member 123. Therefore, the plane of polarization is different by 90° between two reflection laser beams, which are converted to linearly polarized light by the second $\lambda/4$ birefringence member 111.

The pinhole 112 has such an effect that it does not allow the reflection laser beam, having the optical axis deviated from and not correctly facing to the polarized laser beam irradiated from the object reflector detecting unit 3, to enter the first photodetector 114 and the second photodetector 115. The reflection laser beam passing through the pinhole 112 enters the polarization beam splitter 113.

The polarization beam splitter 113 has such an effect that it allows to pass the polarized laser beam having the same direction of polarization as that of the polarized laser beam emitted from the light emitter 162 and reflects the polarized laser beam having a direction of polarization by 90° different from that of the polarized laser beam emitted from the light emitter 162. After passing through the polarization beam splitter 113, the reflection laser beam is split into two polarized light components, which cross perpendicularly each other, and the first photodetector 114 and the second photodetector 115 receive the reflection laser light beams thus split respectively.

In the photodetecting condition of the first photodetector 114 and the second photodetector 115, when the polarized reflection laser beam twice passing through the $\lambda/4$ birefringence member outside of the object reflector detecting unit 3, i.e. the polarized reflection laser beam reflected by the $\lambda/4$ birefringence member 123 of the object reflector 168, enters the reflection light detector 164, the amount of light entering the first photodetector 114 is more than the amount of light entering the second photodetector 115 because of the relationship between the second $\lambda/4$ birefringence member 111 and the polarized beam splitter 113. When the polarized reflection laser beam not passing through the $\lambda/4$ birefringence member, i.e. the polarized reflection laser beam reflected by the exposed portion of the reflection layer 122 of the object reflector 168, enters, the amount of light entering the second photodetector 115 is more than the amount of light entering the first photodetector 114.

By finding the difference of the incident light amount of the polarized reflection laser beam to the first photodetector 114 from that of the beam to the second photodetector 115, it is possible to identify whether the incident polarized reflection laser beam has been reflected by the exposed portion of the reflection layer 122 of the object reflector 168 or it has been reflected by the $\lambda/4$ birefringence member 123. That is, it is possible to detect the border between the exposed portion of the reflection layer 122 and the $\lambda/4$ birefringence member 123, i.e. the center of the object reflector 168.

More detailed description will be given below.

In case of the reflection laser beam twice passing through the $\lambda/4$ birefringence member 123, the amount of light entering the first photodetector 114 of the reflection light detector 164 is more than the amount of light entering the second photodetector 115. The signals are shown in "a" and "b" of FIG. 11. The signals from the first photodetector 114 and the second photodetector 115 are amplified by the amplifiers 131 and 135, and a difference is taken by the differential amplifier 132. The signal is given in FIG. 11 "c". When synchronous detection of the output signal of the differential amplifier 132 is performed by clock 1 from the oscillator circuit 140, a positive voltage (shown by "d" in FIG. 11) to a bias voltage is obtained. When synchronous detection is performed by clock 2, a negative voltage (shown by "e" in FIG. 11) to a bias voltage is obtained. By taking the difference between voltage values obtained by synchronous detection ("d"–"e"), the output of the differential amplifier 134 is a positive voltage (shown by "f" in FIG. 11) to a bias voltage.

In case of the reflection laser beam not passing through the λ/4 birefringence member 123, the amount of light entering the second photodetector 115 of the reflection light detector 164 is more than the amount of light entering the first photodetector 114. The signal is shown in "h" and "i" of FIG. 11. The signals from the first photodetector 114 and the second photodetector 115 are amplified by the amplifiers 131 and 135, and a difference is taken by the differential amplifier 132. The signal is shown in "j" of FIG. 11. When synchronous detection of output signal of the differential amplifier 132 is performed by clock 1 from the oscillator circuit 140, a negative voltage (shown by "k" in FIG. 11) to a bias voltage is obtained. When synchronous detection is performed by clock 2, a positive voltage (shown by "l" in FIG. 11) to a bias voltage is obtained. By taking the difference between the voltage values obtained by synchronous detection ("k"–"l"), the output of the differential amplifier 134 is a negative voltage (shown by "m" in FIG. 11) to a bias voltage.

Figure 12A:
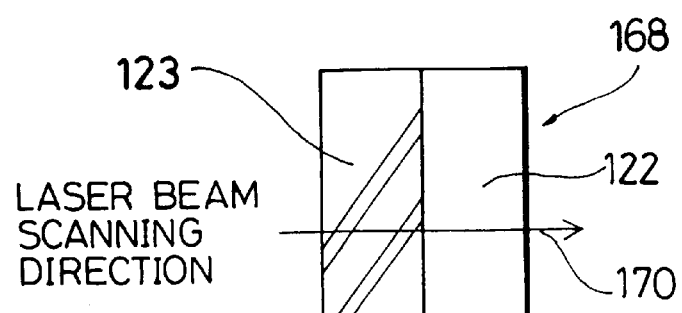
FIG. 12 (A) and FIG. 12 (B) represent a relationship of outputs from the object reflector, the laser beam and the reflection light detection circuit.
Figure 12B:
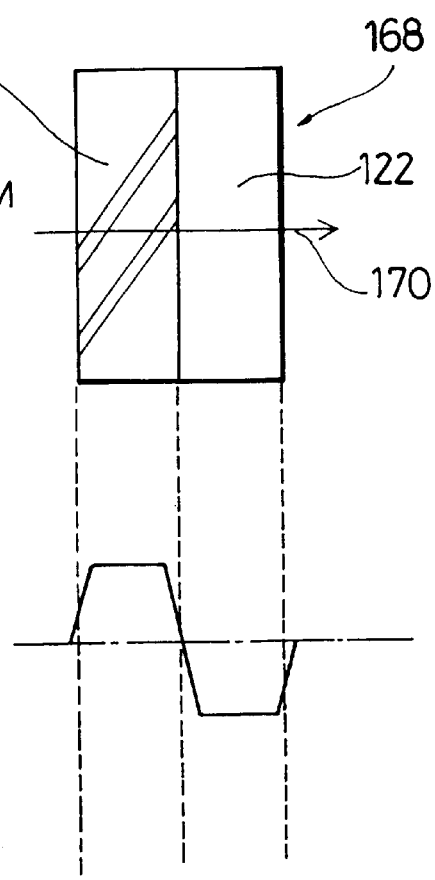

In case the object reflector 168 shown in FIG. 10 or FIG. 12 (A) is scanned by the detection laser beam 170, output of the differential amplifier 134 of the reflection light detection circuit 116 has a waveform as shown in FIG. 12 (B). When a positive signal appears in the output of the differential amplifier 134 and falling of a negative signal occurs within a given time interval from the falling of the positive signal, the position identifier 117 identifies that it is the object reflector 168, and the border position (signal value is 0) when falling of the signal occurs is judged as the center of the object reflector 168.

In case the object reflector 168 is used, it is needless to say that, if the rotating direction of the polarized laser beam is reversed, the sign (+or −) of the output signal of the differential amplifier 134 of the reflection light detection circuit 116 is reversed.

The correction of the direction of the laser irradiation unit 4 after the center of the object reflector 168 has been obtained is the same as in the embodiment already described, and detailed description is not given here.

Figure 13:
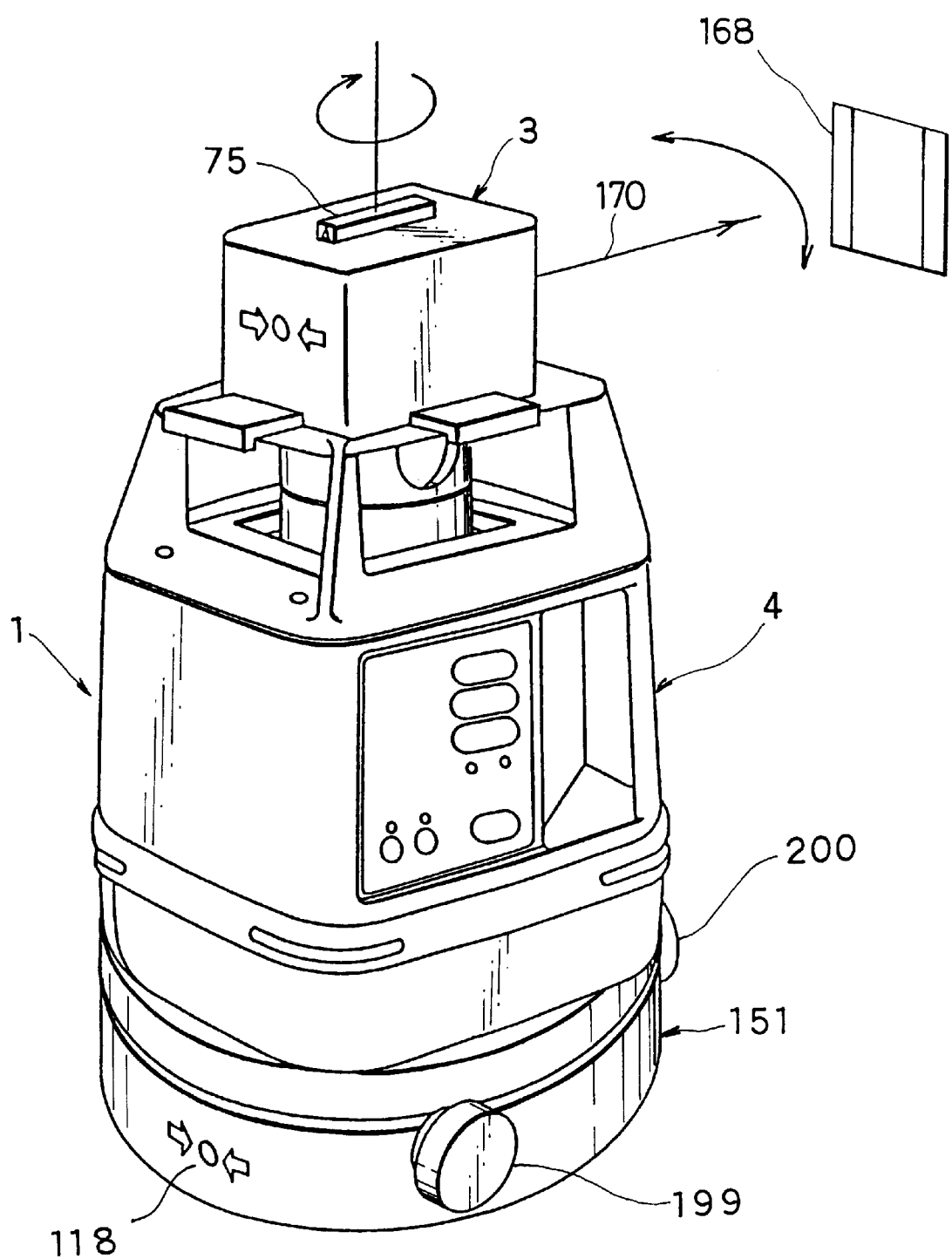
FIG. 13 is a perspective view of a laser survey instrument provided with a manual adjusting mechanism for manually adjusting the direction of the laser irradiation unit.
Figure 14:
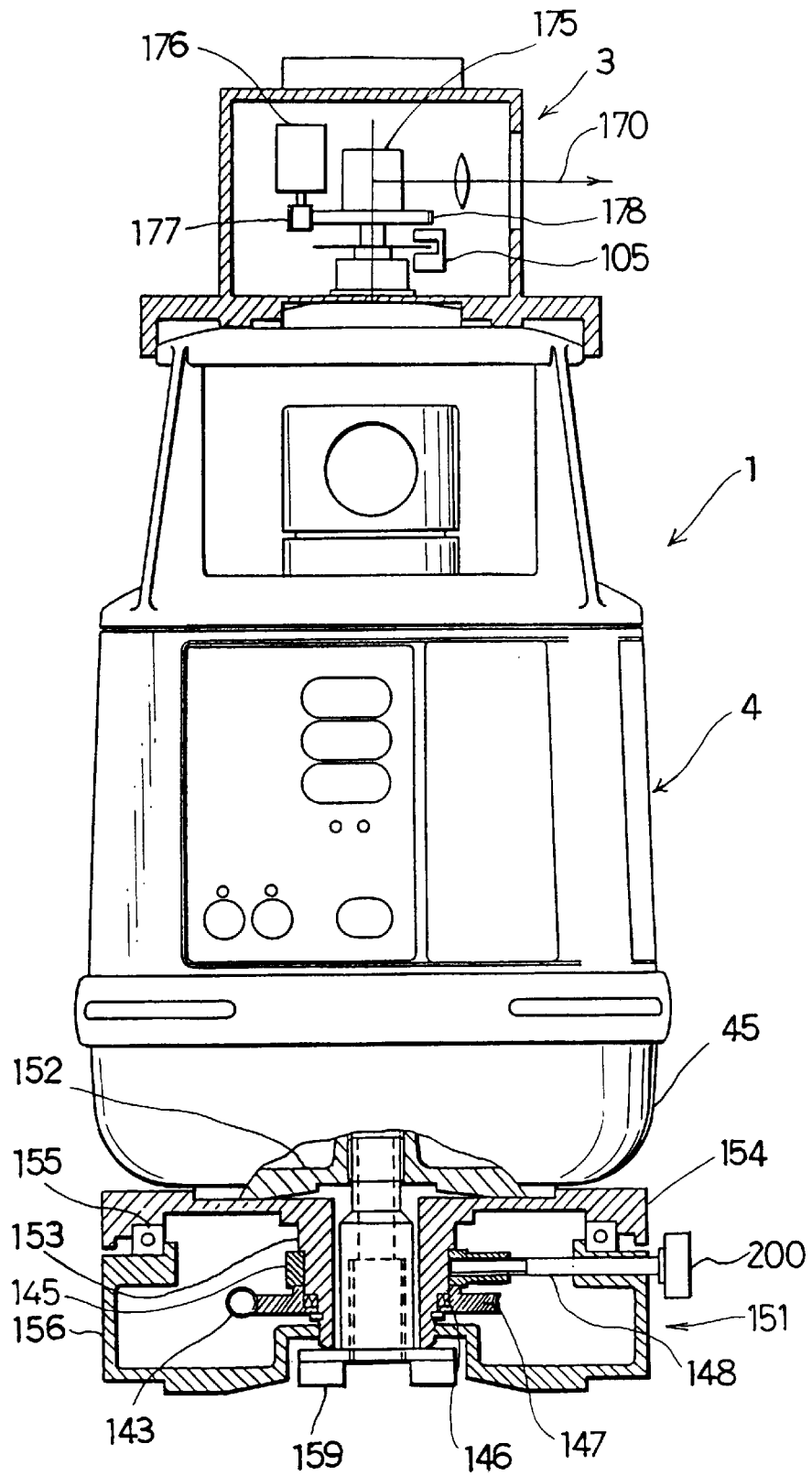
FIG. 14 is a partially cutaway front view of the laser survey instrument.
Figure 15:
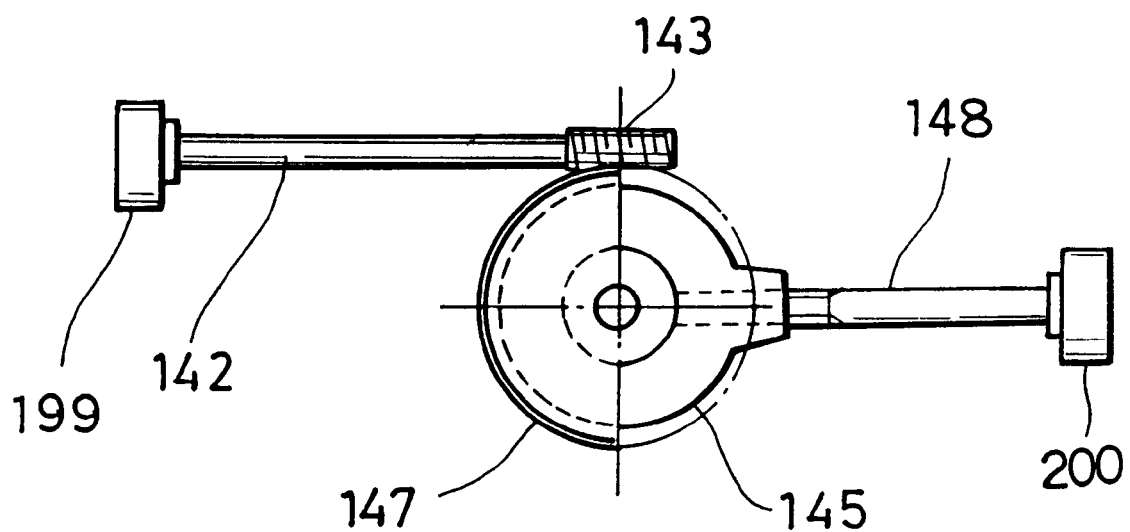
FIG. 15 is a plan view of an essential portion of the manual adjusting mechanism.

Next, description will be given on the laser beam irradiation unit 1 provided with a manual type main body rotating unit 151, which manually rotates the laser irradiation unit 4 and adjusts the direction of the laser irradiation unit 4, referring to FIG. 13 to FIG. 15.

A rotation frame 154 is rotatably mounted on a hollow fixation frame 156 via a bearing 155. At the center of the rotation frame 154, a hollow shaft 153 protruding downward is mounted, and the shaft 153 rotatably penetrates the fixation frame 156. A fixing ring 145 is rotatably mounted on the shaft 153, and a worm wheel 147 is engaged on the lower surface of the fixing ring 145 with a wave washer 146 between them. A fine adjustment rod 142 rotatably penetrating the fixation frame 156 is provided, and a worm gear 143 engaged with the worm wheel 147 is mounted at the tip of the fine adjustment rod 142. A fixing screw 148 rotatably penetrating the fixation frame 156 is screwed into the fixing ring 145 so that the tip of the fixing screw 148 can be brought into contact with the shaft 153. On the protruded outer end of the fine adjustment rod 142, a rotating knob 199 is provided, and a fixing knob 200 is provided on the protruded outer end of the fixing screw 148.

Description will be given now on the adjustment of direction of the laser irradiation unit 4.

For coarse adjustment, the fixing knob 200 is turned to loosen the fixing screw 148, and the laser irradiation unit 4 is manually rotated in a desired direction. Between the worm wheel 147 and the shaft 153, there is friction force by the wave washer 146. When rotating force applied on the laser irradiation unit 4 is increased more than this friction force, it can be manually rotated. For fine adjustment, the rotating knob 199 is turned to rotate the fine adjustment rod 142, and fine rotation of the laser irradiation unit 4 can be achieved via the worm gear 143 and the worm wheel 147.

Thus, the laser irradiation unit 4 can be accurately directed to the desired direction. When the direction of the laser irradiation unit 4 is determined, the fixing screw 148 is tightened to lock the laser irradiation unit 4.

Figure 16:
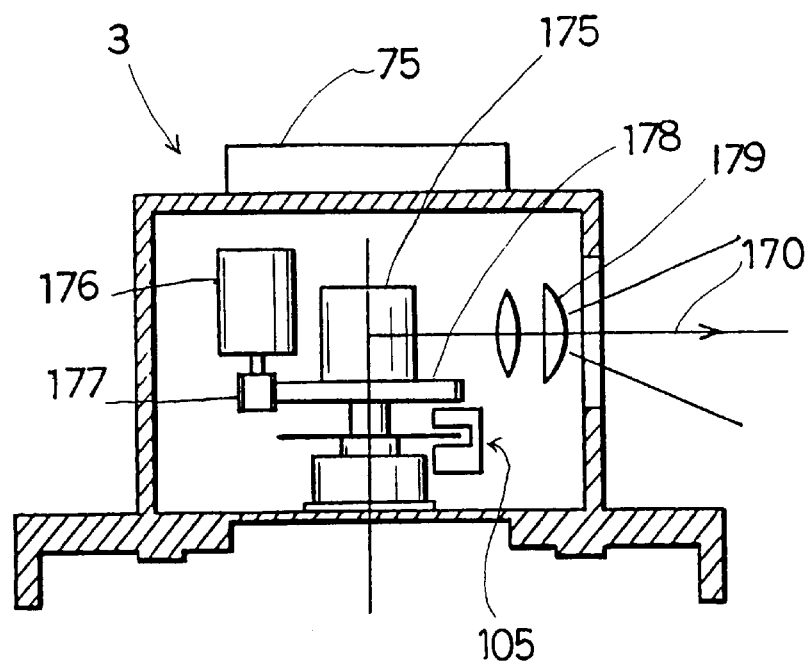
FIG. 16 is a cross-sectional view of another example of the object reflector detecting unit provided on the laser irradiation unit.
Figure 17:
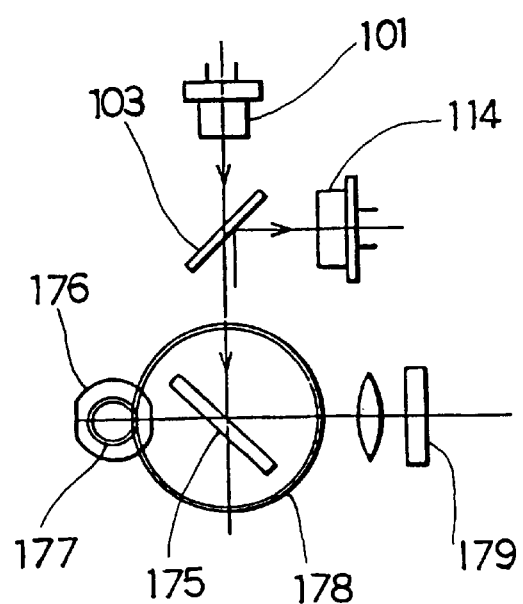
FIG. 17 is a plan view of an essential portion of the object reflector detecting unit.

FIG. 16 and FIG. 17 each represents another example of the object reflector detecting unit 3. In an irradiation window of the laser beam, a cylindrical lens 179 is provided to integrally rotate with the mirror 175. By passing through the cylindrical lens 179, a detection laser beam 170 is spread out in a vertical direction, turning to a fan-shaped beam. Thus, when the light beam is spread in a vertical direction, a reflection light from the object reflector 168 is obtained even when the position of the object reflector 168 is deviated in a vertical direction with respect to the optical axis of the laser beam. The detection range of the object reflector 168 is widened, and this facilitates initial installation of the laser beam irradiation unit 1 and the object reflector 168.

Figure 18:
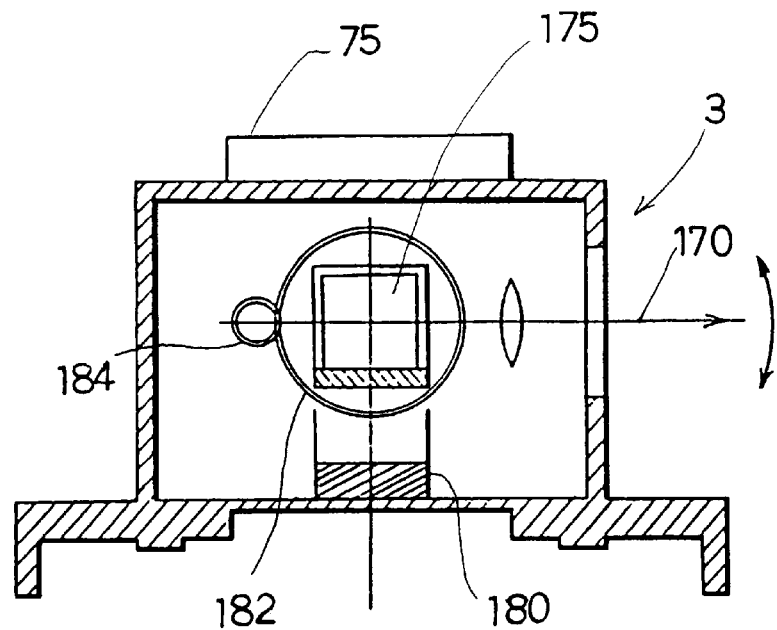
FIG. 18 is a cross-sectional view of still another example of the object reflector detecting unit provided on the laser irradiation unit.
Figure 19:
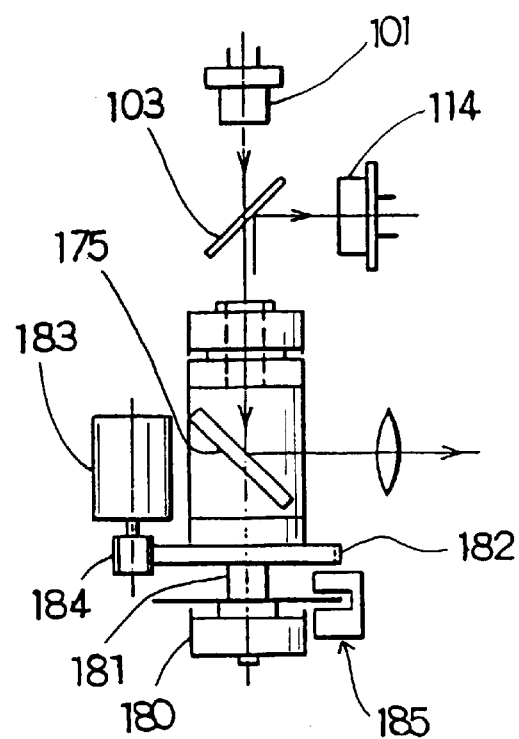
FIG. 19 is a plan view of an essential portion of the object reflector detecting unit.

In the example as shown in FIG. 18 and 19, the detection laser beam 170 can be reciprocally scanned in a vertical direction. In a holder block 180 in form of a concave, a mirror 175 is movably supported via a rotation shaft 181 with a horizontal axis. On the rotation shaft 181, a vertical scanning gear 182 is fixed, and a driving gear 184 of a vertical scanning motor 183 is engaged with the vertical scanning gear 182. An encoder 185 for detecting rotation angle of the rotation shaft 181 with respect to the rotation shaft 181 is provided.

By reciprocally rotating the mirror 175 in a vertical direction within a given range by the vertical scanning motor 183 via the driving gear 184 and the vertical scanning gear 182, the laser beam can be irradiated in a vertical direction for scanning. Further, by rotating the laser irradiation unit 4 by the main body rotating unit 151, it is possible to achieve reciprocal scanning in a vertical direction and to detect the object reflector 168 by rotating in a horizontal direction. Therefore, similarly to the object reflector detecting unit 3 as described above, it is possible to detect the object reflector 168 even when the object reflector 168 is deviated from the optical axis.

Figure 20:
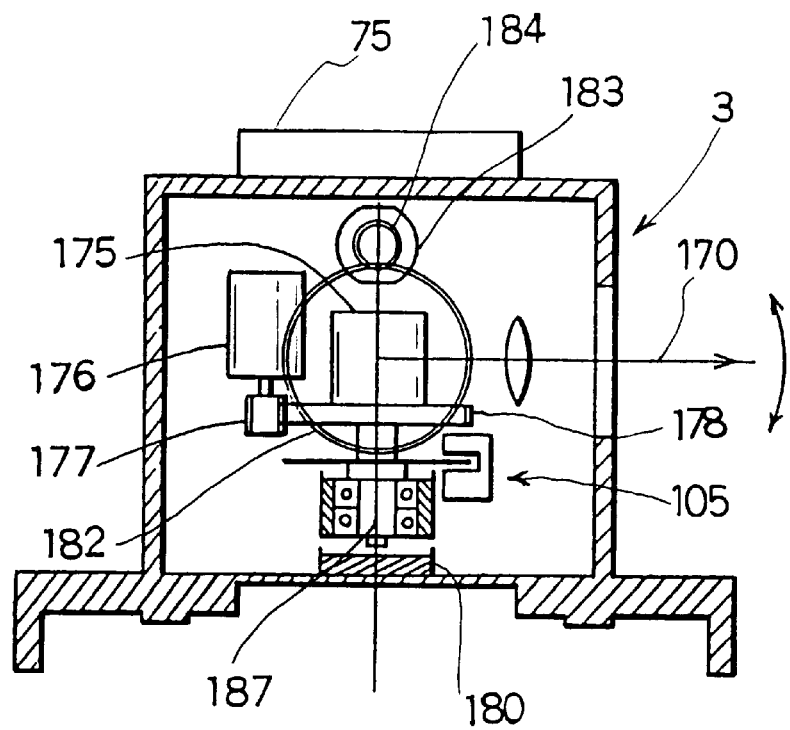
FIG. 20 is a cross-sectional view of still another example of the object reflector detecting unit provided on the laser irradiation unit.
Figure 21:
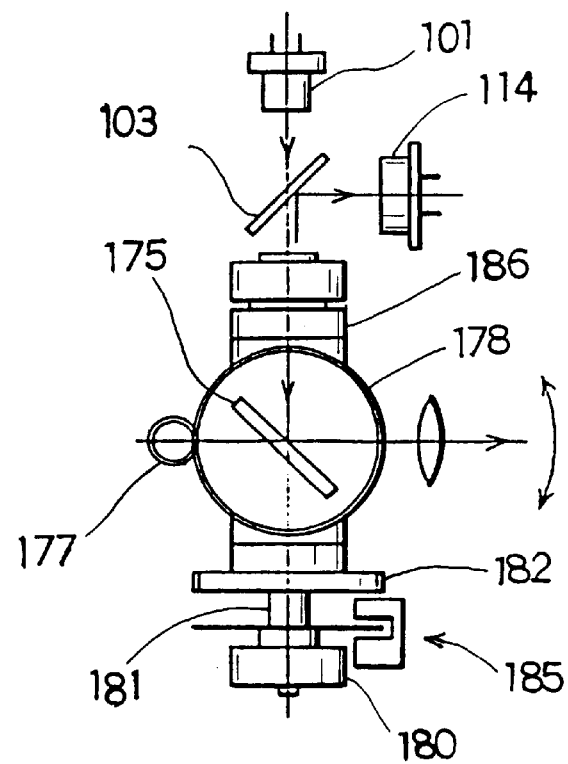
FIG. 21 is a plan view of an essential portion of the object reflector detecting unit.

In the example as shown in FIG. 20 and FIG. 21, the detection laser beam 170 can be irradiated for reciprocal scanning in a horizontal direction, and reciprocal scanning of the detection laser beam 170 in a vertical direction can also be achieved.

A mirror holder 186 is rotatably mounted via a rotation shaft 181, which has a horizontal axis in the holder block 180. On the mirror holder 186, the mirror 175 is rotatably mounted around the vertical axis 187, and the mirror 175 is rotatably supported so that it can be rotated in two directions, i. e. around a vertical axis and a horizontal axis. By the scanning motor 176, the mirror 175 can be reciprocally rotated in a horizontal direction via the gear 177 and the scanning gear 178. Also, the mirror 175 can be reciprocally rotated in a vertical direction by the vertical scanning motor 183 via the driving gear 184, the vertical scanning gear 182, and the mirror holder 186. Therefore, by rotating the laser irradiation unit 4, it is possible to scan in a horizontal direction while the laser beam is irradiated to the object reflector 168 from the object reflector detecting unit 3 for reciprocal scanning in horizontal and/or vertical directions.

Figure 22A:
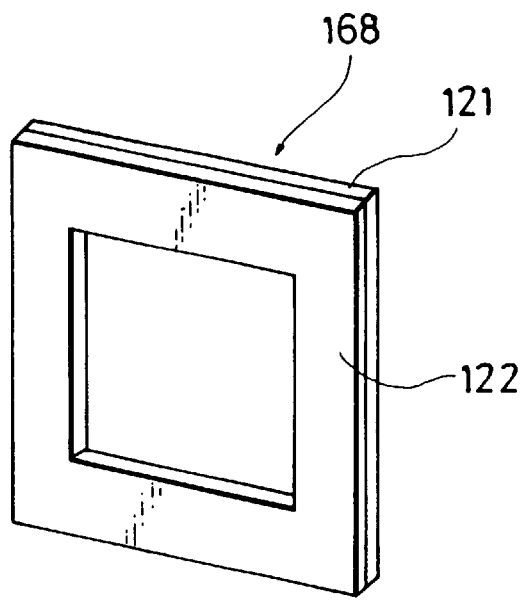
FIG. 22 (A) and FIG. 22 (B) each represents an example of the object reflector.
Figure 22B:
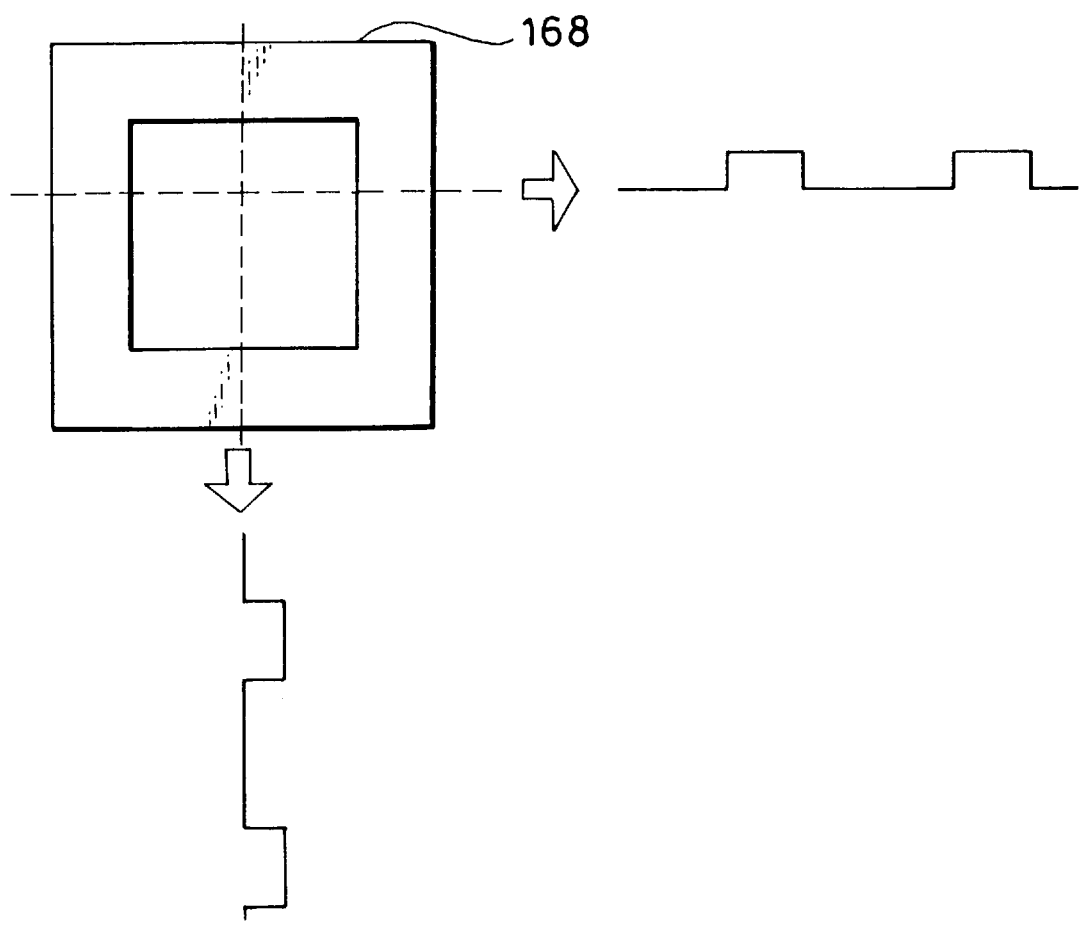
Figure 23A:
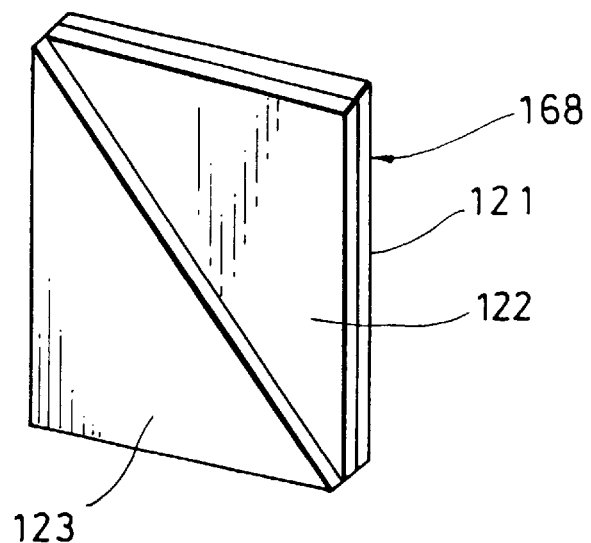
FIG. 23 (A) and FIG. 23 (B) each represents an example of another type of object reflector.
Figure 23B:
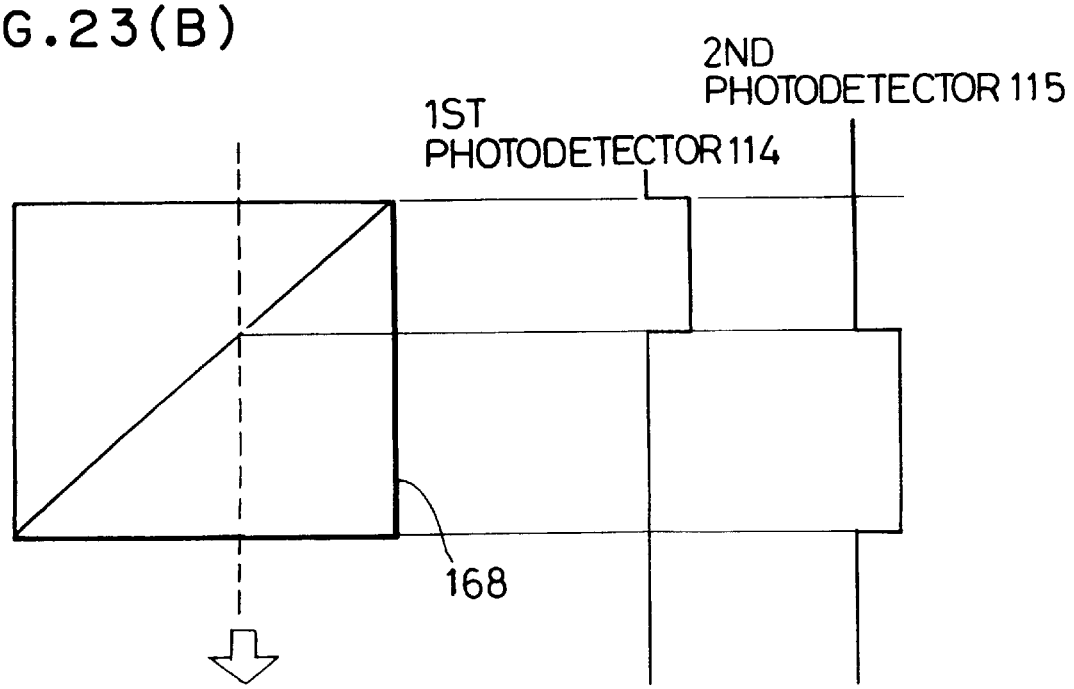

The object reflector 168 shown in FIG. 22 and FIG. 23 is used in case the object reflector 168 is detected by irradiating the detection laser beam 170 in horizontal and vertical directions as in the case of the object reflector detecting unit 3 shown in FIG. 18 and FIG. 19 or of the object reflector detecting unit 3 shown in FIG. 20 and FIG. 21. When the object reflector 168 is used, it is possible to detect the central position in a horizontal direction and a vertical direction.

Here, description will be given on the object reflector 168 used in the present embodiment, referring to FIG. 22 (A). With respect to the central position of the base plate 121, reflection layers 122 are provided at symmetrical positions in upward, downward, leftward and rightward directions. As shown in FIG. 22 (A), the reflection layers 122 are provided along the outer edges of the rectangular base plate 121. When the detection laser beam 170 is irradiated to the object reflector 168 for scanning in a vertical direction, two reflection light beams in pulse-like shape are received as shown in FIG. 22 (B) as in the scanning in a horizontal direction. By calculating the weighted position of the photodetection light beam, the central position in a vertical direction can be identified.

Therefore, the central position in a horizontal direction can be identified by the scanning in a horizontal direction. Next, scanning in a vertical direction is performed at the central position in a horizontal direction, and the central position in a vertical direction, i.e. the central position of the object reflector 168 can be obtained. By detecting the center of the object reflector 168, a tilt angle can be detected. It is also possible to set a tilt angle of the reference laser beam from the laser irradiation unit 4 by the tilt mechanism on the laser irradiation unit 4 to agree with the detected tilt angle.

FIG. 23 represents another example of the object reflector 168. In this case, reciprocal scanning is performed in a vertical direction while the main body rotating unit 151 is rotated. Then, scanning in a horizontal direction is performed, and the reflection light detector 164 capable to detect the direction of polarization of the laser beams is provided as the object reflector detecting unit 3 of FIG. 8.

On a rectangular base plate 121, a reflection layer 122 is formed. The surface of the reflection layer is divided by a diagonal line, and a λ/4 birefringence member 123 is attached on one portion, and the other portion is an exposed portion of the reflection layer 122. The exposed portion serves as a polarization maintaining reflection sector, which reflects the incident light beam while maintaining direction of polarization. The portion with the λ/4 birefringence member 123 serves as a polarization converting reflection sector, which reflects the incident light beam while converting direction of polarization. Thus, the direction of polarization of the laser beam differs according to the two reflection sectors. In the exposed portion of the reflection layer 122 and the portion with the λ/4 birefringence member 123, widths in scanning direction are inversely proportional to each other as the scanning position moves.

The reflection laser beam reflected by the exposed portion of the reflection layer 122 has a phase by λ/2 different from the phase of the reflection laser beam reflected by the λ/4 birefringence member 123. Accordingly, in the two reflection laser beams converted to linearly polarized light by the second λ/4 birefringence member 111, planes of polarization are different by 90°. Therefore, as described above, between the reflection laser beam reflected by the exposed portion of the reflection layer 122 and the reflection laser beam reflected by the λ/4 birefringence member 123, there is difference between the amount of light entering the first photodetector 114 and that of the second photodetector 115 as shown in FIG. 23 (B).

The detection laser beam 170 by rotary irradiation is directed to the object reflector 168 for scanning, and the scanning position is moved in a vertical direction. In the reflection laser beam reflected by the exposed portion of the reflection layer 122 and the reflection laser beam reflected by the λ/4 birefringence member 123, the intensity of signal is inversely proportional to each other. The point where both signals agree is the center of the object reflector 168. Thus, the center of the object reflector 168 can be detected by the polarized reflection light detection circuit 116.

In case the object reflector 168 shown in FIG. 23 is used, by performing reciprocal scanning in a horizontal direction and further reciprocal scanning in a vertical direction, the center of the object reflector 168 can be detected, and a tilt angle can be detected. The tilt angle of the reference laser beam from the laser irradiation unit 4 is set by the tilting mechanism on the laser irradiation unit 4 so that it agrees with the detected tilt angle. Concrete operation for the setting of the tilt angle after detection and formation of the reference plane is as already described.

Figure 1:
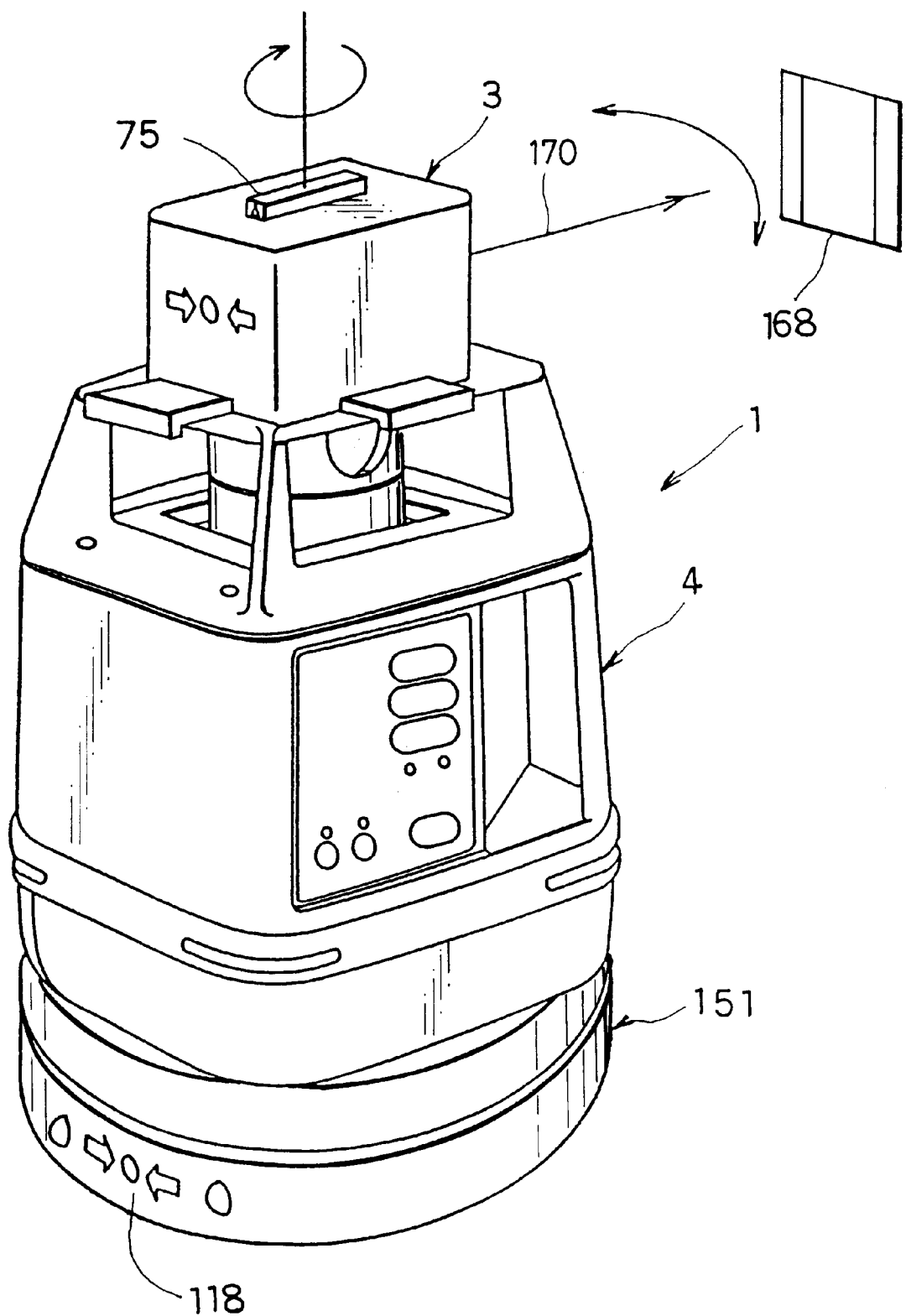
FIG. 1 is a perspective view of a laser survey instrument of an embodiment of the present invention.
Figure 2:
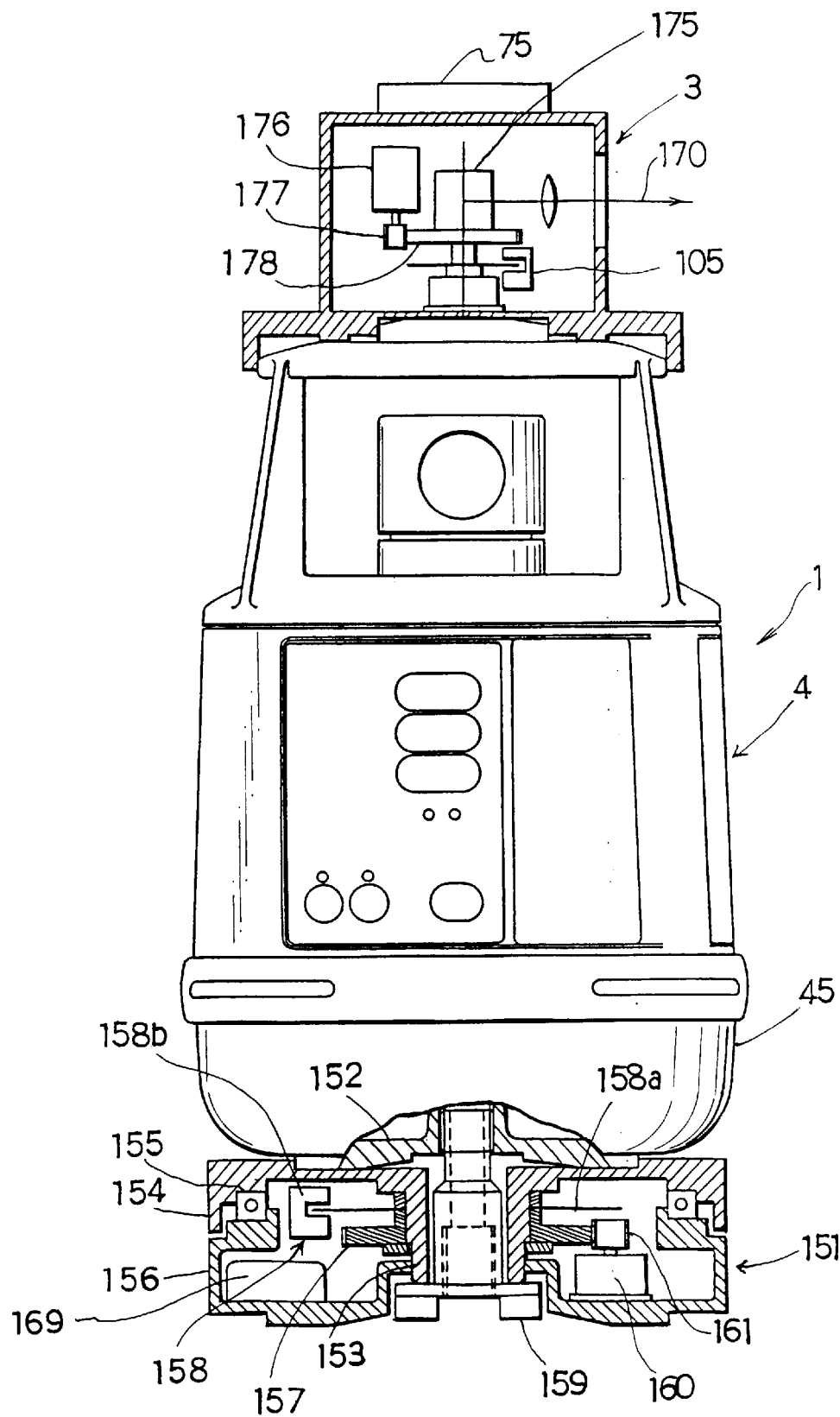
FIG. 2 is a partially cutaway view of the laser survey instrument.
Figure 24:
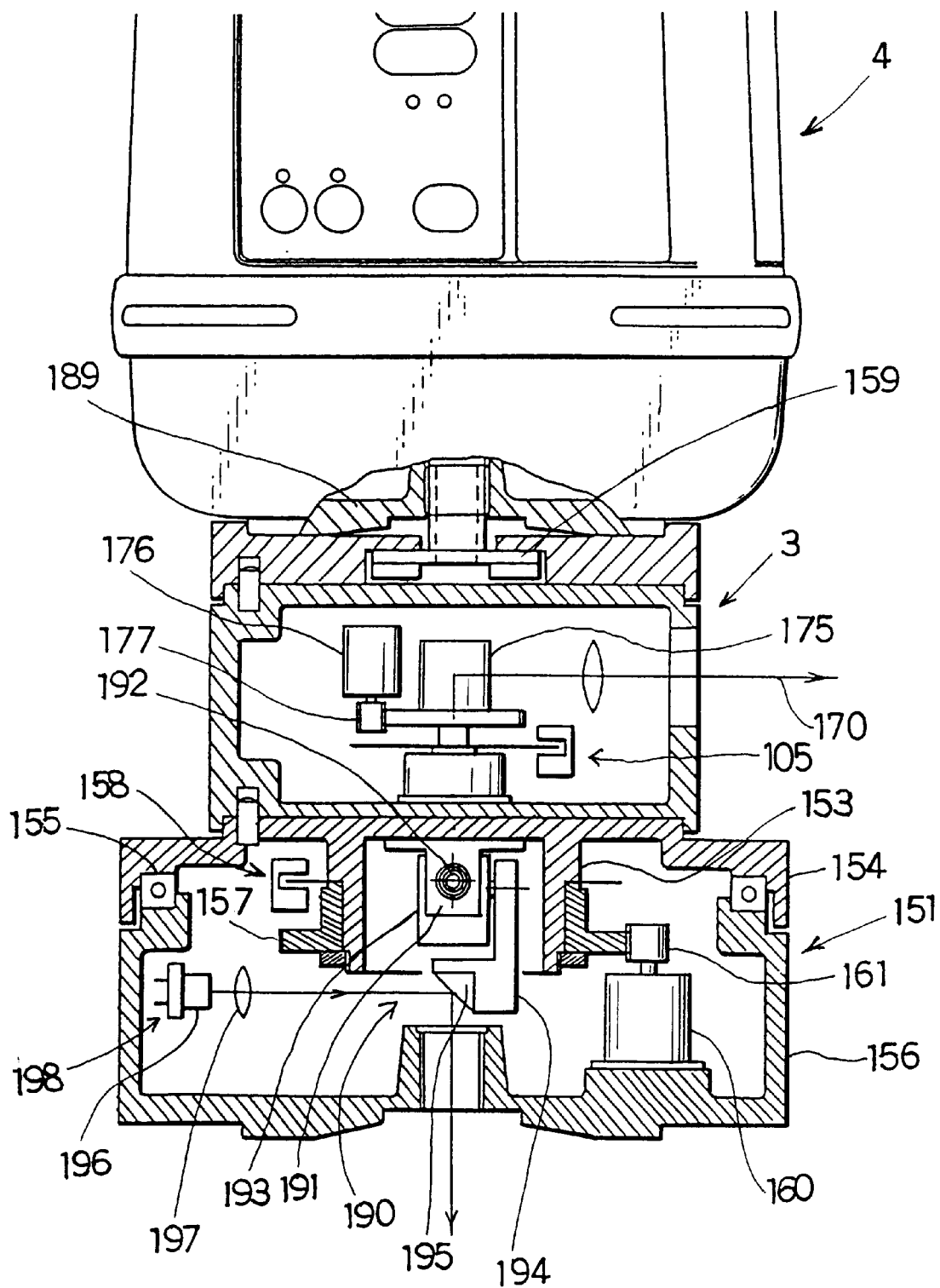
FIG. 24 is a partial cross-sectional view of another embodiment of the invention.

FIG. 24 shows an arrangement where the object reflector detecting unit 3 and the main body rotating unit 151 are integrated and these are provided under the laser irradiation unit 4, and there is provided a compensating mechanism so that a vertical laser beam can be irradiated in a downward direction and the vertical laser beam can be directed in a vertical direction. In this figure, the same component as shown in FIG. 2 is referred by the same symbol, and substantial arrangement of the object reflector detecting unit 3 is the same as explained in connection with FIG. 2, and detailed description is not given here. The main body rotating unit 151 is driven by motor, while this may be replaced with a manual type main body rotating unit shown in FIG. 14 combined with the mechanism to irradiate a vertical laser beam and a compensating mechanism.

On the laser irradiation unit 4, a connection plate 189 is fixed by a fixing screw 159, and the object reflector detecting unit 3 is fixed via the connection plate 189, and the main body rotating unit 151 is fixed on the lower surface of the object reflector detecting unit 3. The shaft 153 suspended from the center of the rotation frame 154 is designed in hollow construction, and a vertical compensator 190 is provided inside the shaft 153.

Description will be given now on the vertical compensator 190. A movable block 193 is movably mounted on a bearing base 191 via a movable shaft 192, and a pendulum 194 is movably suspended from the movable block 193. A reflection mirror 195 is mounted on the pendulum 194. At a position on the fixation frame 156 placed face-to-face to the reflection mirror 195, a vertical laser beam emitter 198 comprising a light emitter 196 such as a laser diode and an optical system such as a collimator lens 197 are arranged.

The laser beam emitted from the vertical laser beam emitter 198 is irradiated in a downward direction by the reflection mirror 195. Because the movable block 193 and the pendulum 194 are freely movable in two directions, the vertical laser beam emitted from the vertical laser beam emitter 198 is always reflected vertically downward by the reflection mirror 195, and the projecting position of the vertical laser beam indicates the point to install the laser survey instrument.

As described above, according to the present invention, the direction to install the survey instrument is detected by the survey instrument itself and the direction is set.

Therefore, there is no intervention of man-made error, and high accuracy can be provided. By spreading the detection laser beam in a vertical direction, the detection range of the object reflector is widened. This facilitates and simplifies positioning of the laser survey instrument with the object reflector and improves working efficiency. Further, when the laser beam is irradiated in a downward direction, the position of the laser survey instrument can be easily aligned with the reference position. In particular, it is useful in case where the laser survey instrument is to be installed at a position higher than ground level.

What we claim are:

1. A laser survey instrument, comprising a laser irradiation unit for forming a reference plane by irradiating and rotating a reference laser beam and for irradiating a detection laser beam in the same direction as said reference laser beam, said laser irradiation unit having tilting means for setting the tilt position of said laser irradiation unit with respect to a horizontal plane, an object reflector detecting unit for irradiating said detection laser beam toward an object reflector positioned in a direction of the tilt position of said laser irradiation unit and for detecting said object reflector based on the reflected laser beam from said object reflector, and a main body rotating unit for rotating the object reflector detecting unit and the laser irradiation unit together so as to turn said object reflector unit and said laser irradiation unit toward said object reflector according to the photodetecting conditions of said object reflector detecting unit.

2. A laser survey instrument according to claim 1, wherein said laser irradiation unit tilting means tilts said reference laser beam and said detection laser beam, said reference laser beam forming a tilt reference plane, whereby the tilt direction of said tilt reference plane corresponds to an irradiation direction of said detection laser beam directed to a reference position of said object reflector detecting unit.

3. A laser survey instrument according to claim 1, wherein said object reflector detecting unit comprises a light emitter for emitting said detection laser beam, a rotator for reciprocal scanning said detection laser beam, an encoder for detecting a rotating position of said rotator, a reflection light detecting unit for receiving and detecting said reflection laser beam from said object reflector and a position identifier for detection of the central position of said object reflector based on signals from said reflection light detecting unit and said encoder, and, said main body rotating unit comprises a rotation motor for rotating the main body so as to turn to said object reflector and a rotation controller for controlling said rotation motor based on a signal from said position identifier.

4. A laser survey instrument according to claim 1, wherein the object reflector detecting unit causes said detection laser beam to reciprocally scan in a vertical direction within a given angle.

5. A laser survey instrument according to one of claims 1, 2, or 3, wherein the object reflector detecting unit comprises optical means for irradiating the detection laser beam by spreading said laser beam in a fan shape in a vertical direction and for reciprocally scanning the detection laser beam in a horizontal direction within a given angle.

6. A laser survey instrument according to one of claims 1, 2, or 3, wherein the object reflector detecting unit irradiates the detection laser beam for reciprocal scanning in horizontal and vertical directions within a given angle.

7. A laser survey instrument according to one of claims 1 to 3, wherein the object reflector detecting unit comprises a vertical laser beam emitter for irradiating a vertical laser beam in a vertical direction and a vertical compensator to direct the vertical laser beam irradiated from said vertical laser beam emitter toward a vertical direction.

8. A laser survey instrument according to claim 2, wherein said tilting direction of the tilting means of the laser irradiation unit and the direction of the detection laser beam from the object reflector detecting unit form a given angle.

9. A laser survey instrument according to one of claims 1 to 3, wherein the object reflector detecting unit can be attached to or removed from the laser irradiation unit.

10. A laser survey instrument according to one of claims 1 to 3, wherein the main body rotating unit can be attached to or removed from the laser irradiation unit.

11. A laser survey instrument according to one of claims 1 to 3, wherein there is provided a main body rotating unit for rotating the laser irradiation unit and the object reflector detecting unit and the main body rotating unit can be attached to or removed from the laser irradiation unit.

12. A laser survey instrument according to one of claims 1 to 3, wherein the main body rotating unit comprises rotation restraining means, manual rotating means for converting the rotation of a rotating knob to the rotation of the object reflector detecting unit, and means for allowing rotation when a force higher than a given rotating force is applied.

13. A laser survey instrument according to claim 2, wherein the object reflector detecting unit is mounted on the laser irradiation unit, and the laser irradiation unit is mounted on the main body rotating unit.

14. A laser survey instrument according to claim 2, wherein the laser irradiation unit is mounted on the object reflector detecting unit, and the objet reflector detecting unit is mounted on the main body rotating unit.

* * * * *